(12) United States Patent
Kajiya et al.

(10) Patent No.: US 11,971,569 B2
(45) Date of Patent: Apr. 30, 2024

(54) OPTICAL BODY AND LIGHT EMITTING DEVICE

(71) Applicant: DEXERIALS CORPORATION, Tokyo (JP)

(72) Inventors: Shunichi Kajiya, Tokyo (JP); Kyoko Sakurai, Tokyo (JP); Katsuhiro Doi, Tokyo (JP); Kazuya Hayashibe, Tokyo (JP); Naoki Hanashima, Tokyo (JP); Naoto Kaneko, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 388 days.

(21) Appl. No.: 16/077,800

(22) PCT Filed: Mar. 23, 2017

(86) PCT No.: PCT/JP2017/011729
§ 371 (c)(1),
(2) Date: Aug. 14, 2018

(87) PCT Pub. No.: WO2017/164309
PCT Pub. Date: Sep. 28, 2017

(65) Prior Publication Data
US 2021/0191024 A1  Jun. 24, 2021

(30) Foreign Application Priority Data
Mar. 25, 2016 (JP) .................. 2016-062290

(51) Int. Cl.
*G02B 1/118* (2015.01)
*F21V 8/00* (2006.01)

(52) U.S. Cl.
CPC ............ *G02B 6/0036* (2013.01); *G02B 1/118* (2013.01); *G02B 6/0045* (2013.01)

(58) Field of Classification Search
CPC .... G02B 6/0045; G02B 5/045; G02B 5/0278; G02B 6/0053; G02B 6/0036; G02B 1/118; F21V 5/02
See application file for complete search history.

(56) References Cited

U.S. PATENT DOCUMENTS 6,359,735 B1    3/2002  Gombert et al.
9,588,259 B2 *  3/2017  Hayashibe ............. G02B 1/118
(Continued)

FOREIGN PATENT DOCUMENTS

CN    102822698 A     12/2012
EP     2180368 A1      4/2010
(Continued)

OTHER PUBLICATIONS

Dec. 2, 2019, Chinese Office Action issued for related CN Application No. 201780019295.9.
(Continued)

*Primary Examiner* — Fatima N Farokhrooz
(74) *Attorney, Agent, or Firm* — Paratus Law Group, PLLC

(57) ABSTRACT

There is provided a light emitting device that can be used as a light guide plate and has an excellent antireflection function to extraneous light, and an optical body includes: a base material; a macro concave-convex structure that is formed on one surface of the base material and emits internally propagating light that is injected in an inside of the base material from a side surface of the base material, from another surface of the base material; and a micro concave-convex structure formed periodically to follow each of both surfaces of the base material and a surface of the macro concave-convex structure, and having an average period of concavity and convexity of less than or equal to a wavelength of visible light. The surface of the macro concave-convex structure has an inclined surface, and an arrangement (Continued)

of the micro concave-convex structure is a zigzag arrangement.

10 Claims, 18 Drawing Sheets

(56) References Cited

U.S. PATENT DOCUMENTS

| | | | |
|---|---|---|---|
| 2005/0270802 A1 | 12/2005 | Hsu et al. | |
| 2008/0158476 A1* | 7/2008 | Miyashita | G02B 6/005 349/65 |
| 2008/0265149 A1* | 10/2008 | Endoh | H01L 31/02366 359/896 |
| 2009/0290093 A1* | 11/2009 | Shimura | G02F 1/133606 362/613 |
| 2014/0211506 A1* | 7/2014 | Nakagome | G02B 6/0033 362/613 |
| 2017/0299778 A1* | 10/2017 | Kajiya | B29C 33/42 |
| 2018/0041661 A1* | 2/2018 | Oshiyama | H04N 1/40056 |

FOREIGN PATENT DOCUMENTS

| | | | |
|---|---|---|---|
| JP | H06-342159 A | 12/1994 | |
| JP | 2003-249110 A | 9/2003 | |
| JP | 2005-208108 A | 8/2005 | |
| JP | 2006-012854 A | 1/2006 | |
| JP | 2007-115438 A | 5/2007 | |
| JP | 2008-159274 A | 7/2008 | |
| JP | 2008-299079 A | 12/2008 | |
| JP | 2011-175917 A | 9/2011 | |
| WO | WO-2016035776 A1 * | 3/2016 | ............ B29C 33/42 |
| WO | WO 2016/035776 A1 | 10/2016 | |

OTHER PUBLICATIONS

Aug. 17, 2020, Chinese Office Action issued for related CN application No. 201780019295.9.
Feb. 4, 2020, Japanese Office Action issued for related JP Application No. 2016-062290.
Oct. 2, 2019, European Search Report issued for related EP Application No. 17770349.3.
May 31, 2021, European Communication issued for related EP application No. 17770349.3.

* cited by examiner

FIG. 2
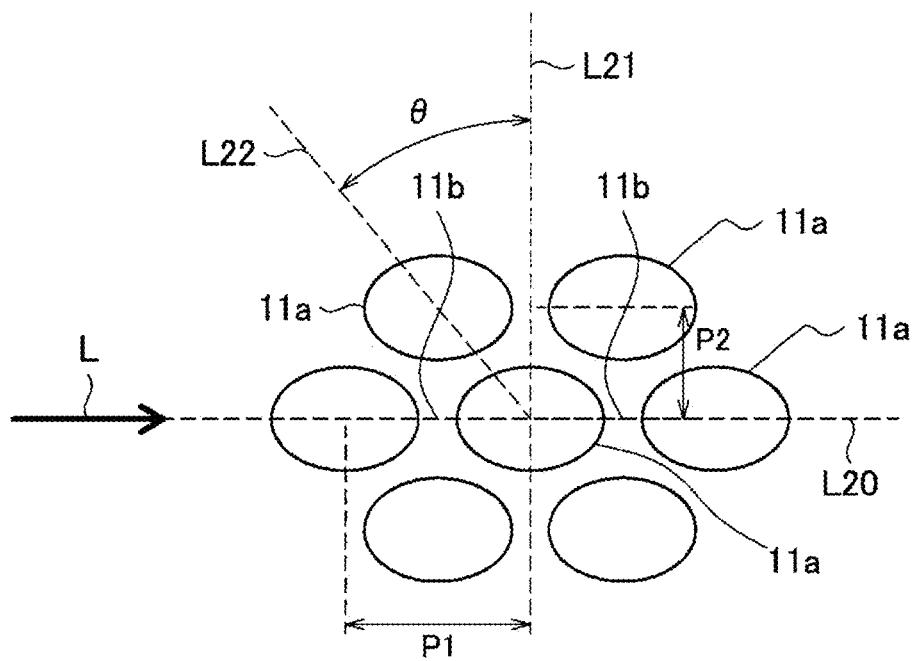
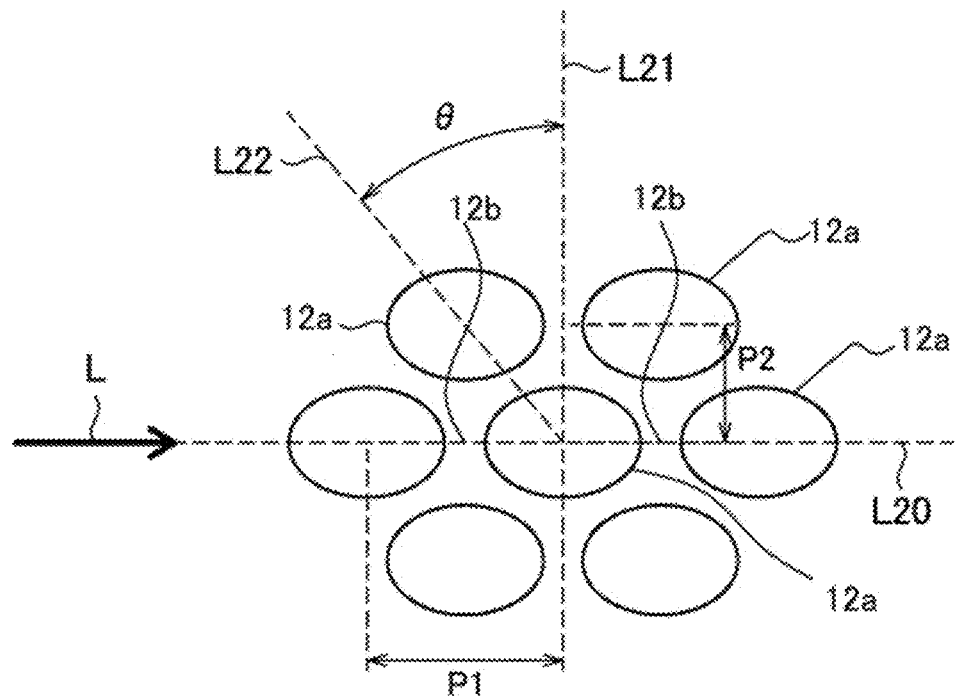

OPTICAL BODY AND LIGHT EMITTING DEVICE

CROSS REFERENCE TO PRIOR APPLICATION

This application is a National Stage Patent Application of PCT International Patent Application No. PCT/JP2017/011729 (filed on Mar. 23, 2017) under 35 U.S.C. § 371, which claims priority to Japanese Patent Application No. 2016-062290 (filed on Mar. 25, 2016), which are all hereby incorporated by reference in their entirety.

TECHNICAL FIELD

The present invention relates to an optical body and a light emitting device.

BACKGROUND ART

As a kind of optical body, there is known an optical body in which a light waveguiding phenomenon and a macro concave-convex structure are combined. Such an optical body is also called a light guide plate. The macro concave-convex structure is formed on one surface of the light guide plate. Light is injected into the inside of the light guide plate from a light source that is provided on a side surface of the light guide plate. The light injected in the inside of the light guide plate, that is, internally propagating light propagates through the inside of the light guide plate while reflecting at surfaces of the light guide plate (that is, interfaces between the inside and the outside of the light guide plate). After that, the internally propagating light is reflected at a surface of the macro concave-convex structure, and is emitted from another surface of the light guide plate. That is, the light guide plate emits light injected from a side surface of the light guide plate, from a surface of the light guide plate. The light guide plate is used as, for example, light emitting bodies for various display devices or light emitting bodies for illumination. Examples of the display device in which a light guide plate is used include various LCDs (for example, an LCD of a local dimming driving system), passive-type display devices, light ornamentation panels for amusement, illumination panels for advertisements such as digital signage, etc. In these display devices, an expression looking as if light stood out from a place where a pattern of a macro concave-convex structure is formed is enabled by the turning on and off of the light source.

In the case where a light guide plate is used as a light emitting body of a display device, an oblique surface of at least one surface of the macro concave-convex structure needs to be an oblique surface with an angle of more than or equal to 30° and less than 90°. Light that has been incident from a side surface of the light guide plate and has traveled through the light guide plate is totally reflected at this oblique surface, and is emitted from a surface of the light guide plate. In such a light guide plate, it is necessary that, when the light source is turned off, the observer be hindered from recognizing the existence of the light guide plate to the extent possible. Furthermore, it is necessary to enhance the display quality. Hence, an excellent antireflection function to extraneous light of high transmission, low reflection, and low scattering is required. This is in order to enhance the display quality of the display device. Here, as the extraneous light, as well as sunlight and light from other light emitting bodies (for example, illumination, other display devices, etc.), there is also light from other display bodies provided inside the display device (for example, a liquid crystal panel, etc.) and the like.

CITATION LIST

Patent Literature

Patent Literature 1: JP 2006-012854A
Patent Literature 2: JP 2003-249110A
Patent Literature 3: JP 2008-299079A

SUMMARY OF INVENTION

Technical Problem

However, no technology that sufficiently meets the requirements described above has been proposed. For example, Patent Literatures 1 to 3 disclose technologies regarding the light guide plate described above. In the technology disclosed in Patent Literature 1, a micro concave-convex structure in which the average period of concavity and convexity is less than or equal to a wavelength of visible light is provided on least one surface of both surfaces of the light guide plate. Here, the micro concave-convex structure is arranged randomly. Further, the distance between convexities or the distance between concavities of the micro concave-convex structure satisfies a prescribed condition.

In the technology disclosed in Patent Literature 2, a light reflection angle control surface is formed in a prescribed position between concavities of a macro concave-convex structure. In the technology disclosed in Patent Literature 3, an antireflection film of a multiple-layer structure is provided on at least one surface of both surfaces of the light guide plate. However, these technologies have failed to sufficiently meet the requirements described above. Hence, a technology that sufficiently meets the requirements described above has been strongly desired.

Thus, the present invention has been made in view of the problem mentioned above, and an object of the present invention is to provide a new and improved optical body and a new and improved light emitting device that can be used as a light guide plate and can have an excellent antireflection function to extraneous light.

Solution to Problem

According to an aspect of the present invention in order to achieve the above object, there is provided an optical body including: a base material; a macro concave-convex structure that is formed on one surface of the base material and emits internally propagating light that is injected in an inside of the base material from a side surface of the base material, from another surface of the base material; and a micro concave-convex structure formed periodically to follow each of both surfaces of the base material and a surface of the macro concave-convex structure, and having an average period of concavity and convexity of less than or equal to a wavelength of visible light. The surface of the macro concave-convex structure has an inclined surface that is inclined with respect to the one surface by more than or equal to 30° and less than 90°, and an arrangement of the micro concave-convex structure is a zigzag arrangement with respect to a traveling direction of internally propagating light.

Here, an angle between an arrangement direction of the micro concave-convex structure and a direction perpendicular to a propagation direction of the internally propagating light may be 30 to 60°.

In addition, the one surface may be partitioned into a light emitting region where the macro concave-convex structure is formed and a non-light emitting region other than the light emitting region, and the micro concave-convex structure may be formed in each of both of the light emitting region and the non-light emitting region.

In addition, the micro concave-convex structure may extend in a direction perpendicular to the surface of the macro concave-convex structure.

In addition, the macro concave-convex structure may be an aggregate of a plurality of macro convexities and a plurality of macro concavities and at least one of the plurality of macro convexities and the plurality of macro concavities may have a prism shape, and the micro concave-convex structure may be formed to follow a surface of each of the plurality of macro convexities and the plurality of macro concavities.

In addition, a luminous reflectance may be less than or equal to 1.0%.

In addition, further a reflection chromaticity (a*, b*) may be less than or equal to 1.0.

In addition, an average height of the micro concave-convex structure may be more than or equal to 200 nm.

In addition, the base material may have a multiple-layer structure.

According to another aspect of the present invention, there is provided a light emitting device including: the above optical body; and a light source that is provided on a side surface of the optical body and injects light into an inside of the optical body from the side surface of the optical body.

Advantageous Effects of Invention

As described above, according to the present invention, a macro concave-convex structure formed on a surface of an optical body can emit internally propagating light that is injected in the inside of a base material from a side surface of the base material, from another surface of the base material. Therefore, the optical body can be used as a light guide plate. Further, a micro concave-convex structure is formed periodically to follow each of both surfaces of the base material and a surface of the macro concave-convex structure, and the average period of concavity and convexity is less than or equal to a wavelength of visible light. Therefore, the optical body has an excellent antireflection function to extraneous light.

BRIEF DESCRIPTION OF DRAWINGS

FIG. 2 is a plan view showing an example of a micro concave-convex structure according to the embodiment.

DESCRIPTION OF EMBODIMENTS

Figure 1:
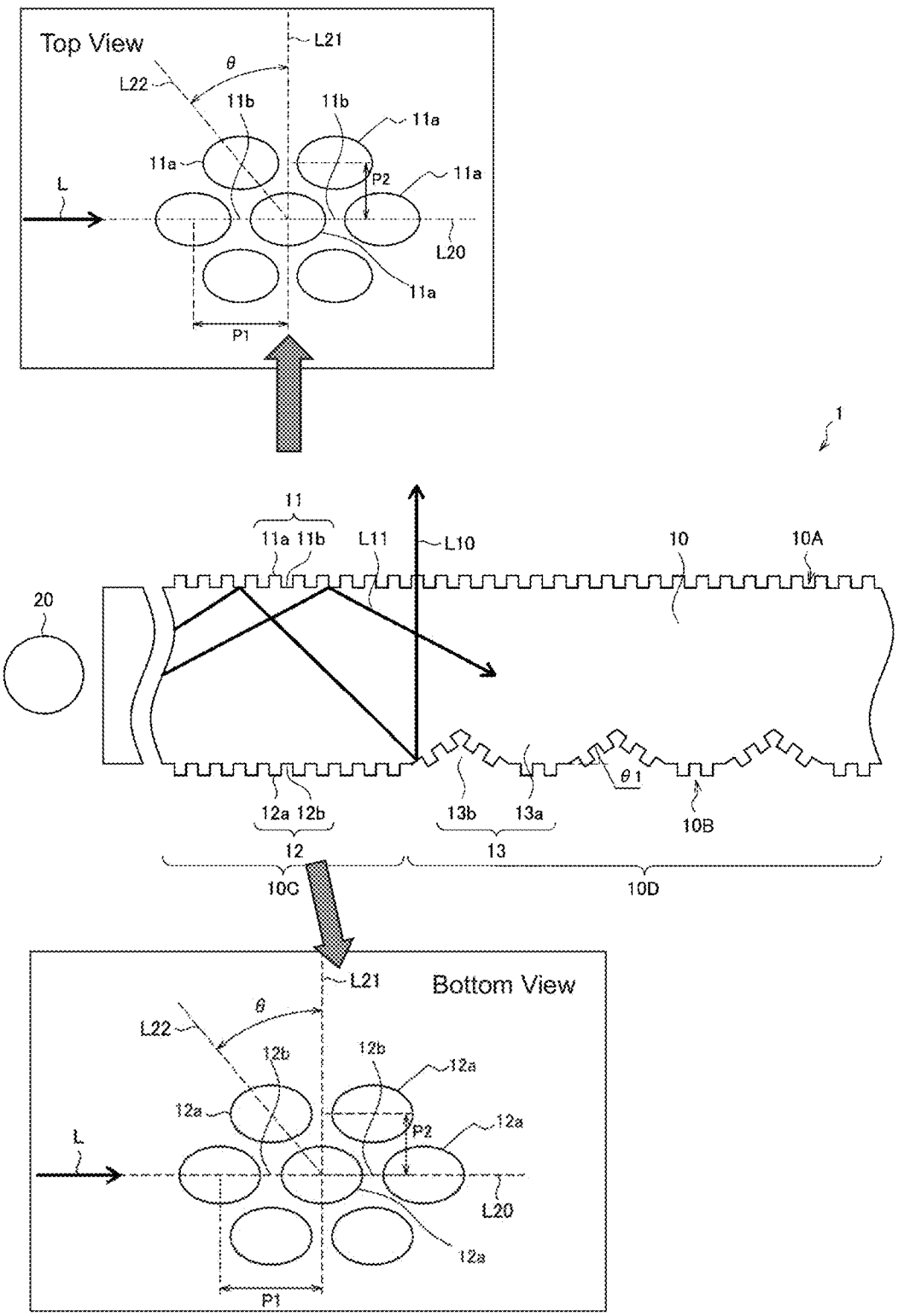
FIG. 1 is a side cross-sectional view with a top and bottom view showing a rough configuration of an optical body according to an embodiment of the present invention.

Hereinafter, (a) preferred embodiment(s) of the present invention will be described in detail with reference to the appended drawings. In this specification and the appended drawings, structural elements that have substantially the same function and structure are denoted with the same reference numerals, and repeated explanation of these structural elements is omitted.

<1. Configuration of Optical Body>

Next, the configuration of an optical body 1 according to the present embodiment is described on the basis of FIG. 1 and FIG. 2. The optical body 1 includes a base material 10, a first micro concave-convex structure 11, a second micro concave-convex structure 12, and a macro concave-convex structure 13. The optical body 1 can function as what is called a light guide plate. That is, the optical body 1 emits internally propagating light that is injected in the optical body 1 from a side surface of the optical body 1, from a surface of the optical body 1 (specifically, a first surface 10A described later) to the outside.

The base material 10 propagates light injected in the inside of the base material 10, that is, internally propagating light in planar directions of the base material 10 (that is, directions perpendicular to the thickness direction; in FIG. 1, horizontal directions). While details are described later, the optical body 1 is produced by pressing, under a heated condition, a macro concave-convex master having the inverse shape of the macro concave-convex structure 13 against the base material 10 on which the first micro concave-convex structure 11 and the second micro concave-convex structure 12 are formed. Hence, the base material 10 is required to soften under a heated condition. Thus, the base material 10 is preferably formed of a thermoplastic resin excellent in light conductivity. Examples of such a resin include polymethyl methacrylate, a polycarbonate, A-PET, a cycloolefin copolymer, a cycloolefin polymer, and the like. The thickness of the base material 10 is not particularly limited, and may be adjusted in accordance with the use etc. of the optical body 1, as appropriate. Further, the base material 10 may be a multiple-layer structure. For example, the optical body 1 may be produced by sticking together a base material on which the first micro concave-convex structure 11 is formed and a base material on which the second micro concave-convex structure 12 and the macro concave-convex structure 13 are formed. It is also possible to stick a base material on which the first micro concave-convex structure 11 is formed and a base material on which the second micro concave-convex structure 12 and the macro concave-convex structure 13 are formed, individually to the front and back surfaces of a base material formed of a resin other than thermoplastic resins. In this case, the base material on which the second micro concave-convex structure 12 and the macro concave-convex structure 13 are formed is formed of a thermoplastic resin.

The first micro concave-convex structure 11 is formed periodically to follow a surface (hereinafter, also referred to as a first surface) 10A of the base material 10. That is, the first micro concave-convex structure 11 extends in a direction perpendicular to the first surface 10A. In the first micro concave-convex structure 11, the average period of concavity and convexity is less than or equal to a wavelength of visible light (for example, less than or equal to 830 nm). The average period of concavity and convexity is preferably more than or equal to 100 nm and less than or equal to 350 nm, more preferably more than or equal to 120 nm and less than or equal to 280 nm, and still more preferably 130 to 270 nm. Therefore, the first micro concave-convex structure 11 has what is called a moth-eye structure. Here, in the case where the average period is less than 100 nm, the formation of the first micro concave-convex structure 11 may be difficult; thus, this is not preferable. Further, in the case where the average period is more than 350 nm, the intensity of diffracted light may be large. That is, there is a possibility that internally propagating light will diffract at the first surface 10A and leak out to the outside.

Here, the configuration of the first micro concave-convex structure 11 is described in detail on the basis of FIG. 1 and FIG. 2. The first micro concave convex structure 11 has large numbers of first micro convexities 11a and first micro concavities 11b. The first micro convexity 11a has a shape protruding on the outside in the thickness direction of the optical body 1, and the first micro concavity 11b has a shape recessed on the inside in the thickness direction of the optical body 1. The first micro convexity 11a and the first micro concavity 11b are formed periodically on the first surface 10A. That is, it can be said that the first micro concave-convex structure 11 is a structure in which tracks (rows) composed of a plurality of first micro convexities 11a and a plurality of first micro concavities 11b are arranged parallel to each other. In the example of FIG. 1, the track extends in the left and right direction, and is aligned in the up and down direction. The first micro convexities 11a (or the first micro concavities 11b) arranged between adjacent tracks are mutually shifted in the length direction of the track by half the dot pitch P1 of the first micro convexity 11a (or the first micro concavity 11b).

The average period of concavity and convexity is given as the arithmetic average value of a dot pitch P1 and a track pitch P2. The dot pitch P1 is the distance between first micro convexities 11a (or first micro concavities 11b) arranged in the length direction of the track; i.e., a distance between apices of adjacent micro concave-convex structures in the same row. The track pitch P2 is the distance between adjacent tracks, i.e., a distance, perpendicular to the length direction of a track, between apices of the micro concave-convex structures in two adjacent rows. Examples of dot pitch P1 and track pitch P2 are illustrated in FIG. 2. In the present embodiment, each of the dot pitch P1 and the track pitch P2 is less than or equal to a wavelength of visible light. The dot pitch P1 and the track pitch P2 may be the same or different.

Here, the dot pitch P1 is specifically the distance between first micro convexities 11a (or first micro concavities 11b) arranged in the length direction of the track. The first micro concave-convex structure 11 can be observed with, for example, a scanning electron microscope (SEM), a cross-sectional transmission electron microscope (cross-sectional TEM), or the like. The dot pitch P1 is measured by the following method, for example. That is, a combination of first micro convexities 11a adjacent in the length direction of the track is picked out. Then, the distance between the apices of the first micro convexities 11a may be taken as the dot pitch P1. Further, the track pitch P2 is the distance between adjacent tracks. The track pitch P2 is measured by the following method, for example. That is, a combination of adjacent tracks is picked out. Then, the distance between the tracks may be taken as the track pitch P2.

The arrangement direction of the first micro concave-convex structure 11 is classified into two arrangement directions, that is, a dot arrangement direction L20 and a crossing arrangement direction L22. The dot arrangement direction L20 agrees with the extension direction of the track. The crossing arrangement direction L22 is defined as a direction connecting the apices of first micro convexities 11a (or first micro concavities 11b) adjacent in the arrangement direction of tracks (herein, the up and down direction).

In the present embodiment, it is preferable that the angle between at least one arrangement direction of the dot arrangement direction L20 and the crossing arrangement direction L21, and a straight line L21 perpendicular to the propagation direction L of internally propagating light be 30 to 60°. In the example of FIG. 2, the angle θ between the crossing arrangement direction L22 and the straight line L21 is 30 to 60°.

Here, the propagation direction L of internally propagating light is defined as the propagation direction of internally propagating light that is incident perpendicularly to a side surface of the base material 10. Therefore, the propagation direction L is parallel to the planar direction of the base material 10. Further, a plane normal to the propagation direction L and the planar direction of the base material 10 cross perpendicularly.

Thereby, in the present embodiment, even if internally propagating light leaks out to the outside before reflected at the macro concave-convex structure 13, it is difficult for the observer to visually identify such leaked light.

In the example shown in FIG. 2, the first micro concave-convex structure 11 is arranged in a zigzag fashion with respect to the traveling direction of internally propagating light. That is, the traveling direction of internally propagating light and the dot arrangement direction of the first micro concave-convex structure 11 substantially agree. As a matter of course, the arrangement of the first micro concave-convex structure 11 is not limited to this example. That is, any arrangement is possible as long as it satisfies the requirements described above. For example, the first micro concave-convex structure 11 may be arranged in a rectangular lattice fashion.

There are no particular limitations on the average height of the first micro concave-convex structure 11. That is, the average height of the first micro concave-convex structure 11 may be a height similar to or different from the average height of the second micro concave-convex structure 12. In the case where the average height of the first micro concave-convex structure 11 is different from the average height of the second micro concave-convex structure 12, the average height of the first micro concave-convex structure 11 is preferably more than or equal to 100 nm and less than or equal to 300 nm, more preferably more than or equal to 130 nm and less than or equal to 300 nm, and still more preferably more than or equal to 150 nm and less than or equal to 230 nm. The average height of the first micro concave-convex structure 11 is the arithmetic average value of the heights of the first micro convexities 11a. The height of the first micro convexity 11a can be measured by the observation method described above. That is, the heights of some first micro convexities 11a may be measured, and the arithmetic average value of these may be taken as the average height of the first micro concave-convex structure 11. The first micro convexity 11a extends in a direction perpendicular to the first surface 10A.

The second micro concave-convex structure 12 is formed periodically to follow a surface (hereinafter, also referred to as a "second surface") 10B of the base material 10. That is, the second micro concave-convex structure 12 extends in a direction perpendicular to the second surface 10B. The second micro concave-convex structure 12 has similar features to the first micro concave-convex structure 11. That is, in the second micro concave-convex structure 12, the average period of concavity and convexity is less than or equal to a wavelength of visible light (for example, less than or equal to 830 nm). The average period of concavity and convexity is preferably more than or equal to 100 nm and less than or equal to 350 nm, more preferably more than or equal to 120 nm and less than or equal to 280 nm, and still more preferably 130 to 270 nm. Therefore, the second micro concave-convex structure 12 has what is called a moth-eye structure. Here, in the case where the average period is less than 100 nm, the formation of the second micro concave-convex structure 12 may be difficult; thus, this is not preferable. Further, in the case where the average period is more than 350 nm, the intensity of diffracted light may be large. That is, there is a possibility that internally propagating light will diffract at the second surface 10B and leak out to the outside.

The second micro concave-convex structure 12 has large numbers of second micro convexities 12a and second micro concavities 12b. The second micro convexity 12a has a shape protruding on the outside in the thickness direction of the optical body 1, and the second micro concavity 12b has a shape recessed on the inside in the thickness direction of the optical body 1. The second micro convexity 12a and the second micro concavity 12b are formed periodically on the second surface 10B. The arrangement of the second micro concave-convex structure 12 is similar to the arrangement of the first micro concave-convex structure 11.

Therefore, the average period of concavity and convexity is given as the arithmetic average value of the dot pitch P1 and the track pitch P2. Further, the arrangement direction of the second micro concave-convex structure 12 is classified into two arrangement directions, that is, the dot arrangement direction L20 and the crossing arrangement direction L22. In the present embodiment, the angle between at least one arrangement direction of the dot arrangement direction L20 and the crossing arrangement direction L22, and the straight line L21 perpendicular to the propagation direction L of internally propagating light is 30 to 60°.

The second micro concave-convex structure 12 is provided in each of both of a region where the macro concave-convex structure 13 is formed, that is, a light emitting region 10D and a non-light emitting region 10C where the macro concave-convex structure 13 is not formed. The non-light emitting region 10C is a region other than the light emitting region 10D of the second surface 10B. In the non-light emitting region 10C, the micro concave-convex structure 12 is formed to follow the surface of the non-light emitting region 10C. That is, the micro concave-convex structure 12 extends in a direction perpendicular to the surface of the non-light emitting region 10C.

In the light emitting region 10D, the macro concave-convex structure 13 is formed. Therefore, when light is injected into the optical body 1 from a light source 20, the internally propagating light is reflected at the macro concave-convex structure 13 in the light emitting region 10D, and is emitted to the outside of the optical body 1. Thereby, light is emitted in a region of the first surface 10A facing the light emitting region 10D. Thus, the light emitting region 10D is a region where internally propagating light is emitted. On the other hand, in the non-light emitting region 10C, the macro concave-convex structure 13 is not formed. Thus, light is not emitted in a region of the first surface 10A facing the non-light emitting region 10C.

In the light emitting region 10D, the second micro concave-convex structure 12 is formed to follow the surface of the macro concave-convex structure 13. That is, the second micro convexity 12a extends in a direction perpendicular to the surface of the macro concave-convex structure 13. The average height of the second micro concave-convex structure 12 is preferably more than or equal to 200 nm. Thereby, the antireflection function in the place on the macro concave-convex structure 13 can be enhanced more. The upper limit value of the average height of the second micro concave-convex structure 12 is not particularly limited, but is preferably less than or equal to 300 nm. Thus, in the present embodiment, the micro concave-convex structure 12 is provided in each of both of a light emitting region 12D and a non-light emitting region 12C. Here, in the case where the optical body 1 is used as a light guide plate, it is necessary that the observer be hindered from recognizing the non-light emitting region to the extent possible. Furthermore, it is necessary that, when the light source is turned off, the observer be hindered from recognizing the existence of the optical body 1 to the extent possible. Hence, in both of a light emitting region 13D and a non-light emitting region 13C, an excellent antireflection function to extraneous light of high transmission, low reflection, and low scattering is required. Thus, in the present embodiment, the micro concave-convex structure 12 is provided in each of both of the light emitting region 12D and the non-light emitting region 12C.

The first micro concave-convex structure 11 and the second micro concave-convex structure 12 may be molded integrally with the base material 10, or may be separate structure bodies from the base material 10. Further, the concave-convex patterns of the first micro concave-convex structure 11 and the second micro concave-convex structure 12 may not necessarily be the same as long as the requirements described above are satisfied.

The macro concave-convex structure 13 is formed on a part of the second surface 10B. The macro concave-convex structure 13 is an aggregate of a plurality of macro convexities 13a and a plurality of macro concavities 13b. The macro concavity 13b has a shape recessed in the thickness direction of the optical body 1 with respect to the non-light emitting region 10C. The macro concavity 13b may have what is called a prism shape. That is, the macro concavity 13b is a long-length concavity extending in any planar direction of the second surface 10B (a direction perpendicular to the thickness direction of the optical body 1). In the example of FIG. 1, the macro concavity 13b extends in a direction perpendicular to the drawing sheet. As a matter of course, the shape of the macro concavity 13b is not limited to this. The macro convexity 13a is placed between macro concavities 13b. The apices of the macro convexities 13a are arranged in a substantially identical planar manner to the non-light emitting region 10C. Thus, while details are described later, the macro concave-convex structure 13 is formed by pressing a macro concave-convex master having the inverse shapes of the macro concavities 13b (see FIG. 5 and FIG. 6) against the second micro concave-convex structure 12. In the present embodiment, the macro concavity 13b emits internally propagating light toward the outside of the optical body 1. That is, internally propagating light is reflected at the surface of the macro concavity 13b.

The specific shape of the macro concave-convex structure 13 is not particularly limited, and may be a shape similar to a macro concave-convex structure employed in a light guide plate. However, the macro concavity 13b preferably has an inclined surface that is inclined with respect to the second surface 10B, and the angle θ1 between the inclined surface and the second surface 10B is preferably more than or equal to 30° and less than 90°. In this case, the macro concavity 13b can emit internally propagating light to the outside of the optical body 1 more reliably.

The macro concave-convex structure 13 is formed on a part of the second surface 10B. Hence, as described above, the second surface 10B is partitioned into the non-light emitting region 10C and the light emitting region 10D. As a matter of course, the macro concave-convex structure 13 may be formed on the entire second surface 10B. In this case, the entire second surface 10B serves as the light emitting region 10D. Light is emitted on the entire first surface 10A.

Figure 3:
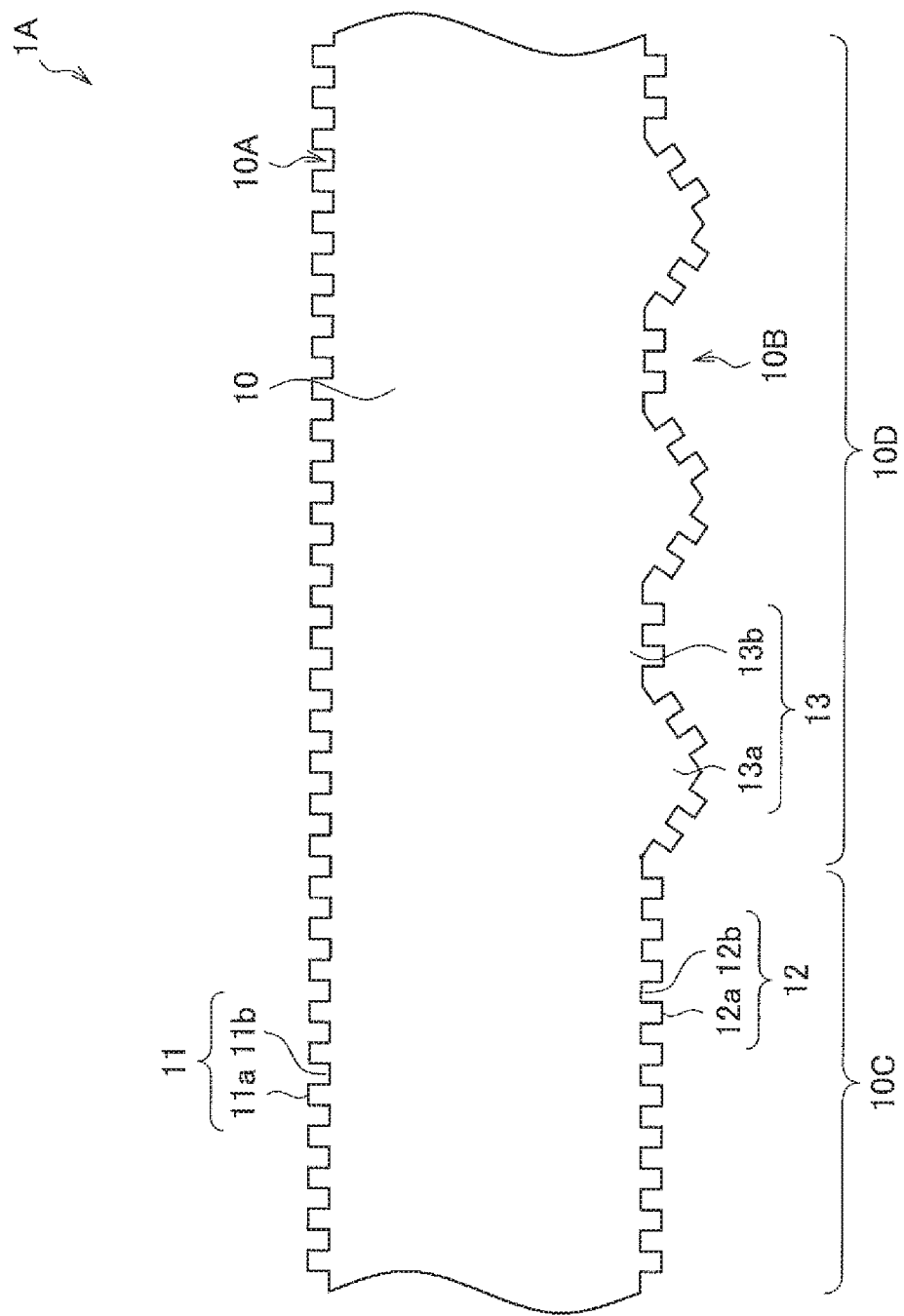
FIG. 3 is a side cross-sectional view showing a modification example of the optical body.

The shape of the macro concave-convex structure 13 is not limited to the example shown in FIG. 2. For example, as shown in FIG. 3, the macro concave-convex structure 13 may have the inverse shape of FIG. 2. In an optical body 1A shown in FIG. 3, the macro convexity 13a has a shape protruding in the thickness direction of the optical body 1 with respect to the non-light emitting region 10C. The macro convexity 13a has what is called a prism shape. In this example, internally propagating light is reflected at the surface of the macro convexity 13a, and is emitted to the outside of the optical body 1A. The angle between the inclined surface of the macro convexity 13a and the second surface 10B is more than or equal to 30° and less than 90°. In this case, the macro concavity 13b can emit internally propagating light to the outside of the optical body 1 more reliably. The micro concave-convex structure 12 is formed to follow the inclined surface of the macro convexity 13a. Depending on the objective of the optical body 1, a micro concave-convex structure may be selectively formed only in at least a flat portion (herein, the first surface 10A and the non-light emitting region 10C). For example, a micro concave-convex structure may not be formed on the macro concave-convex structure 13.

The luminous reflectance of the optical body 1, particularly the luminous reflectance of the light emitting region 10D, is preferably less than or equal to 1.0%. The reflection chromaticity (a*, b*) of the optical body 1, particularly the reflection chromaticity (a*, b*) of the light emitting region 10D, is preferably less than or equal to 1.0.

<2. Configuration of Light Emitting Device>

Next, the configuration of a light emitting device is described on the basis of FIG. 1. The light emitting device includes the optical body 1 described above and the light source 20. The operation of the light emitting device is generally as follows. First, light is incident on the optical body 1 from the light source 20. The light injected in the inside of the optical body 1, that is, the internally propagating light propagates through the inside of the optical body 1 while reflecting at the first surface 10A and the second surface 10B of the optical body 1 (that is, interfaces between the inside and the outside of the optical body 1). After that, the internally propagating light is reflected at the surface of the macro concave-convex structure 13, and is emitted from another surface of the light guide plate. Thereby, the optical body 1 emits light. The straight line L10 shows an example of the optical path of internally propagating light reflected at the surface of the macro concave-convex structure 13. On the other hand, the straight line L10 shows an example of the optical path of internally propagating light propagating through the inside of the optical body 1. In the present embodiment, there is a case where a part of the internally propagating light is emitted as leaked light to the outside of the optical body 1. Specifically, when internally propagating light arrives at the first surface 10A or the second surface 10B of the optical body 1, the internally propagating light may diffract and leak out to the outside. The internally propagating light propagates through the optical body 1 in various directions, and has various wavelengths. Hence, diffracted light due to the arrangements of the first micro concave-convex structure 11 and the second micro concave-convex structure 12 (that is, leaked light) is likely to be a problem.

In this respect, the arrangement directions of the first micro concave-convex structure 11 and the second micro concave-convex structure 12 satisfy the requirements described above; thus, most of the leaked light is emitted to positions different from the position of the observer. Therefore, it is difficult for the observer to visually identify leaked light. Thus, in the case where, for example, the light emitting device is used as a light emitting device (what is called a backlight or the like) of an LCD, the observer can visually identify a clearer image.

On the other hand, in the case where the arrangement direction of the first micro concave-convex structure 11 does not satisfy the requirement described above, most of the leaked light that has leaked out from the first surface 10A is emitted toward the observer. Hence, it is easy for the observer to visually identify leaked light. Thus, in the case where, for example, the light emitting device is used as a light emitting device (what is called a backlight or the like) of an LCD, the image may be colored by leaked light. Consequently, the visibility of the image is worsened. In the case where the second micro concave-convex structure 12 does not satisfy the requirement described above, a similar event may occur on the second surface 10B.

Further, since the average period of concavity and convexity of the first micro concave-convex structure 11 and the second micro concave-convex structure 12 is less than or equal to a wavelength of visible light, the reflection of extraneous light can be suppressed. Further, internally propagating light reflected at the macro concave-convex structure 13 is emitted to the outside through the first micro concave-convex structure 11. Therefore, the optical body 1 has an excellent antireflection function to extraneous light, and can hinder the observer from visually identifying leaked light. That is, in the present embodiment, the observer can be hindered from visually identifying leaked light generated in the non-light emitting region 10C, and therefore the contrast between the light emitting region 10D and the non-light emitting region 10C can be improved. For example, the non-light emitting region 10C looks black to the observer, and this black color looks distinct. Further, the first micro concave-convex structure 11 can also suppress reflection in the inside of the optical body 1, that is, the reflection of internally propagating light. Therefore, a larger amount of internally propagating light is emitted to the outside. Thereby, the optical body 1 can cause most of the internally propagating light reflected at the surface of the macro concave-convex structure to be emitted to the outside. That is, light extraction efficiency is improved.

<3. Method for Manufacturing Optical Body>

Next, a method for manufacturing the optical body 1 is described. First, the first micro concave-convex structure 11 and the second micro concave-convex structure 12 are formed on both surfaces of the base material 10. Specifically, a micro concave-convex master 100 (see FIG. 4) having the inverse shape of the first micro concave-convex structure 11 and the second micro concave-convex structure 12 is prepared. Further, an uncured resin layer is formed on each of both surfaces of the base material 10. The uncured resin layer is made of an uncured curing resin. Then, the uncured resin layer is cured while the micro concave-convex structure (specifically, a master concave-convex structure 120) of the micro concave-convex master 100 is transferred to the uncured resin layer. By the above steps, the first micro concave-convex structure 11 and the second micro concave-convex structure 12 are formed on both surfaces of the base material 10. It is also possible to stick together a base material on which the first micro concave-convex structure 11 is formed and a base material on which the second micro concave-convex structure 12 is formed. Further, it is also possible to stick, to the base material 10, a film on which the first micro concave-convex structure 11 is formed and a film on which the second micro concave-convex structure 12 is formed. Since the base material 10 is formed of a thermoplastic resin, the master concave-convex structure 120 of the micro concave-convex master 100 may be transferred directly to the base material 10. A detailed formation method is described later.

Further, a macro concave-convex master is prepared. Here, a macro concave-convex structure having the inverse shape of the macro concave-convex structure 13, specifically, master macro convexities having the inverse shapes of the macro concavities 13b have been formed on the surface of the macro concave-convex master. The material of the macro concave-convex master is not particularly limited. For example, the macro concave-convex master may be formed of a similar material to the micro concave-convex master 100. The macro concave-convex master can be produced by the following steps. That is, a metal mold is produced by cutting a metal body having a surface subjected to copper plating or the like, with a cutting tool having a tip of a symmetric, V-like shape. The angle θ1 described above can be adjusted by adjusting the vertex angle of the cutting tool. For example, when the vertex angle of the cutting tool is 90°, the angle θ1 is 45°. The depth of concavity and convexity can be adjusted by the amount of indentation of the cutting tool. Then, the metal mold is transferred to another material (that is, the material of the macro concave-convex master), and thereby the macro concave-convex master is produced. Here, the transfer method is not particularly limited. For example, the concavities and convexities of the metal mold may be transferred to another metal material by the electroforming method. Alternatively, a curing resin layer made of a UV curing resin or the like may be formed on the concavities and convexities of the metal mold, and the resin layer may be cured.

Next, while the base material 10 and the macro concave-convex master are heated in an atmosphere of a pressure-propagating medium, the master macro convexities of the macro concave-convex master are pressed against the second micro concave-convex structure 12. Thereby, the base material 10 deforms to follow the shapes of the master macro convexities. That is, the master macro convexities are transferred to the second micro concave-convex structure 12. Here, the pressure-propagating medium may be any medium as long as it is a medium through which pressure propagates. For example, the pressure-propagating medium may be compressed air, a liquid, a semi-solid, semi-liquid viscoelastic body, or a viscous body. The pressure is preferably more than or equal to 0.1 MPa, and more preferably more than or equal to 0.7 MPa. The heating temperature of the base material 10 and the macro concave-convex master is not particularly limited as long as it is such a temperature that the base material 10 can deform to follow the shapes of the master macro convexities. However, the heating temperature is preferably more than 150° C. and less than 250° C., and more preferably 180 to 220 degrees. If the heating temperature is less than or equal to 150 degrees, the shape of the base material 10 may not sufficiently follow the macro convexities of the macro concave-convex master. Further, if the heating temperature is more than 250 degrees, the base material 10 may be damaged due to heat. In Examples described later, a viscous body is used as the pressure-propagating medium, the pressure is set to 0.7 MPa, and the heating temperature is set to 180 to 220° C. By the present manufacturing method, an optical body in which the macro concave-convex structure 13 and the twelfth micro concave-convex structure 12 are formed to be superimposed is obtained.

After once an optical body 1 is produced, the optical body 1 may be used as a transfer mold to produce another optical body 1. In this case, for example, an uncured resin layer is formed on each of both surfaces of the other base material 10. Then, the first micro concave-convex structure 11 may be transferred to one uncured resin layer, and the second micro concave-convex structure 12 and the macro concave-convex structure 13 may be transferred to the other uncured resin layer. By this method, for example, the optical body 1 shown in FIG. 1 can be used as a transfer mold to produce the optical body 1A shown in FIG. 3. In the case where the optical body 1 is used as a transfer mold, it is preferable that release treatment be performed on both surfaces of the optical body 1 in advance.

<4. Configuration of Micro Concave-Convex Master>

Figure 4:
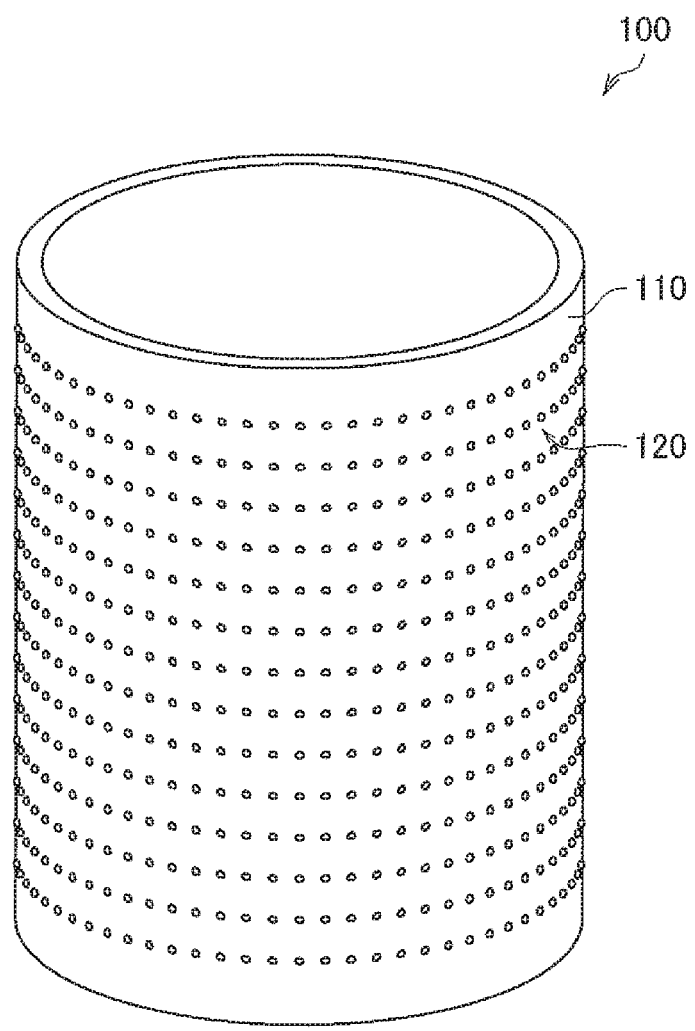
FIG. 4 is a perspective diagram illustrating an exemplary appearance of a master according to the present embodiment.

The first micro concave-convex structure 11 and the second micro concave-convex structure 12 are produced using, for example, the micro concave-convex master 100 shown in FIG. 4. Thus, next, the configuration of the micro concave-convex master 100 is described. The micro concave-convex master 100 is a master used in the nanoimprinting method, and has a round cylindrical shape, for example. The micro concave-convex master 100 may have a round columnar shape or other shapes (for example, a flat plate-like shape). In the case where the micro concave-convex master 100 has a round columnar or round cylindrical shape, the concave-convex structure (that is, the master concave-convex structure) 120 of the micro concave-convex master 100 can be transferred seamlessly to the base material 10 by a roll-to-roll system. Thereby, the first micro concave-convex structure 11 and the second micro concave-convex structure 12 can be formed on the base material 10 with high efficiency. From such a point of view, the shape of the micro concave-convex master 100 is preferably a round cylindrical shape or a round columnar shape.

The micro concave-convex master 100 is provided with a master base material 110, and the master concave-convex structure 120 formed on the circumferential surface of the master base material 110. The master base material 110 may be a glass body, for example, and specifically may also be formed from quartz glass. However, the master base material 110 is not particularly limited insofar as the $SiO_2$ purity is high, and may also be formed from a material such as fused quartz glass or synthetic quartz glass. The master base material 110 may also be a laminate of the above materials on a metal matrix, or a metal matrix. The shape of the master base material 110 is a hollow round cylindrical shape, but may also be a round columnar shape, or some other shape. However, as described above, the master base material 110 preferably has a hollow round cylindrical shape or a round columnar shape. The master concave-convex structure 120 has the inverse shape of the first micro concave-convex structure 11 and the second micro concave-convex structure 12. In the case where the first micro concave-convex structure 11 and the second micro concave-convex structure 12 have different shapes, micro concave-convex masters corresponding to these shapes may be prepared.

<5. Method of Manufacturing Micro Concave-Convex Master>

Next, a method of manufacturing micro concave-convex master 100 will be described. First, a base material resist layer is formed (deposited) on the master base material 110. At this point, the resist constituting the base material resist layer is not particularly limited, and may be either an organic resist or an inorganic resist. Examples of organic resists include novolac-type resist and chemically-amplified resist. Also, examples of inorganic resists include metallic oxides including one or multiple types of transition metals such as tungsten (W) or molybdenum (Mo). However, in order to conduct thermal reaction lithography, the base material resist layer preferably is formed with a thermo-reactive resist including a metallic oxide.

In the case of using an organic resist, the base material resist layer may be formed on the master base material 110 by using a process such as spin coating, slit coating, dip coating, spray coating, or screen printing. Also, in the case of using an inorganic resist for the base material resist layer, the base material resist layer may be formed by sputtering.

Next, by exposing part of the base material resist layer with an exposure device 200 (see FIG. 5), a latent image is formed on the base material resist layer. Specifically, the exposure device 200 modulates laser light 200A, and irradiates the base material resist layer with the laser light 200A. Consequently, part of the base material resist layer irradiated by the laser light 200A denatures, and thus a latent image corresponding to the master concave-convex structure 120 may be formed in the base material resist layer. The latent image is formed in the base material resist layer at an average cycle less than or equal to the visible light wavelengths.

Next, by dripping a developing solution onto the base material resist layer in which is formed the latent image, the base material resist layer is developed. As a result, a concave-convex structure is formed in the base material resist layer. Subsequently, by etching the master base material 110 and the base material resist layer using the base material resist layer as a mask, the master concave-convex structure 120 is formed on the master base material 110. Note that although the etching method is not particularly limited, dry etching that is vertically anisotropic is preferable. For example, reactive ion etching (RIE) is preferable. By the above steps, the micro concave-convex master 100 is produced. Note that anodic porous alumina obtained by the anodic oxidation of aluminum may also be used as the master. Anodic porous alumina is disclosed in WO 2006/059686, for example. Additionally, the micro concave-convex master 100 may also be produced by a stepper using a reticle mask with an asymmetric shape.

Here, a desired master concave-convex structure 120 can be formed by adjusting the irradiation manner of laser light 200A. Thereby, the shape of the master concave-convex structure 120 can be made the inverse shape of the first micro concave-convex structure 11 and the second micro concave-convex structure 12.

<6. Configuration of Exposure Device>

Figure 5:
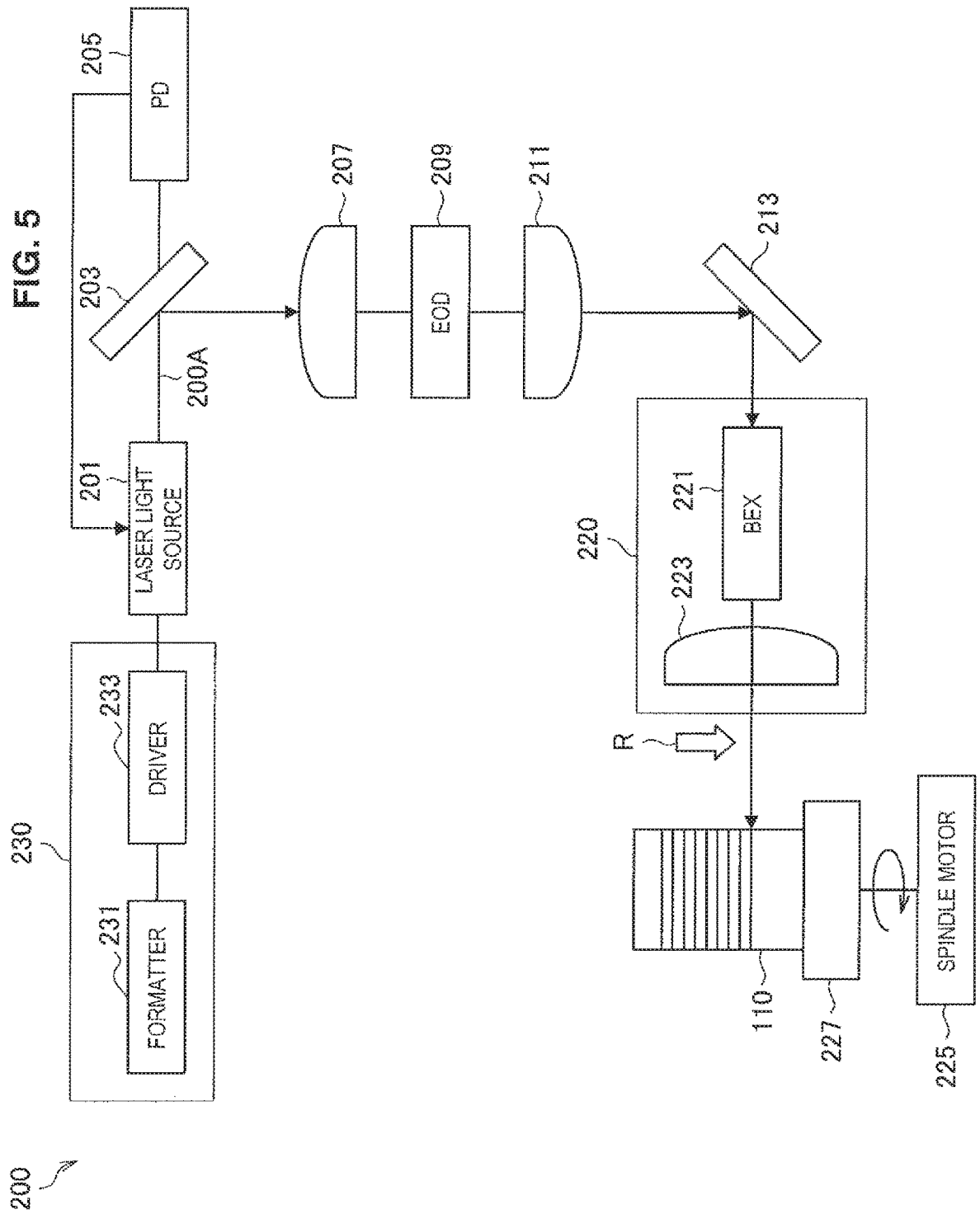
FIG. 5 is a block diagram illustrating an exemplary configuration of an exposure device.

Next, the configuration of the exposure device 200 will be described on the basis of FIG. 5. The exposure device 200 is a device that exposes the base material resist layer. The exposure device 200 is provided with a laser light source 201, a first mirror 203, a photodiode (PD) 205, a deflecting optical system, a control mechanism 230, a second mirror 213, a movable optical table 220, a spindle motor 225, and a turntable 227. Also, the master base material 110 is placed on the turntable 227 and able to be rotated.

The laser light source 201 is a light source that emits laser light 200A, and is a device such as a solid-state laser or a semiconductor laser, for example. The wavelength of the laser light 200A emitted by the laser light source 201 is not particularly limited, but may be a wavelength in the blue light band from 400 nm to 500 nm, for example. Also, it is sufficient for the spot diameter of the laser light 200A (the diameter of the spot radiated onto the resist layer) to be smaller than the diameter of the open face of a concavity of the master concave-convex structure 120, such as approximately 200 nm, for example. The laser light 200A emitted from the laser light source 201 is controlled by the control mechanism 230.

The laser light 200A emitted from the laser light source 201 advances directly in a collimated beam, reflects off the first mirror 203, and is guided to the deflecting optical system.

The first mirror 203 is made up of a polarizing beam splitter, and has a function of reflecting one polarized component, and transmitting the other polarized component. The polarized component transmitted through the first mirror 203 is sensed by the photodiode 205 and photoelectrically converted. Also, the photodetection signal photoelectrically converted by the photodiode 205 is input into the laser light source 201, and the laser light source 201 conducts phase modulation of the laser light 200A on the basis of the input photodetection signal.

In addition, the deflecting optical system is provided with a condenser lens 207, an electro-optic deflector (EOD) 209, and a collimator lens 211.

In the deflecting optical system, the laser light 200A is condensed onto the electro-optic deflector 209 by the condenser lens 207. The electro-optic deflector 209 is an element capable of controlling the radiation position of the laser light 200A. With the electro-optic deflector 209, the exposure device 200 is also able to vary the radiation position of the laser light 200A guided onto the movable optical table 220 (what is called a Wobble mechanism). After the radiation position is adjusted by the electro-optic deflector 209, the laser light 200A is converted back into a collimated beam by the collimator lens 211. The laser light 200A exiting the deflecting optical system is reflected by the second mirror 213, and guided level with and parallel to the movable optical table 220.

The movable optical table 220 is provided with a beam expander (BEX) 221 and an objective lens 223. The laser light 200A guided to the movable optical table 220 is shaped into a desired beam shape by the beam expander 221, and then radiated via the objective lens 223 onto the base material resist layer formed on the master base material 110. In addition, the movable optical table 220 moves by one feed pitch (track pitch) in the direction of the arrow R (feed pitch direction) every time the master base material 110 undergoes one rotation. The master base material 110 is placed on the turntable 227. The spindle motor 225 causes the turntable 227 to rotate, thereby causing the master base material 110 to rotate. With this arrangement, the laser light 200A is made to scan over the base material resist layer. At this point, a latent image of the base material resist layer is formed along the scanning direction of the laser light 200A. Consequently, the track direction of the first micro concave-convex structure 11 and the second micro concave-convex structure 12 (that is, the direction of the arrow B) corresponds to the scanning direction of the laser light 200A.

In addition, the control mechanism 230 is provided with a formatter 231 and a driver 233, and controls the radiation of the laser light 200A. The formatter 231 generates a modulation signal that controls the radiation of the laser light 200A, and the driver 233 controls the laser light source 201 on the basis of the modulation signal generated by the formatter 231. As a result, the irradiation of the master base material 110 by the laser light 200A is controlled.

The formatter 231 generates a control signal for irradiating the base material resist layer with the laser light 200A, on the basis of an input image depicting an arbitrary pattern to draw on the base material resist layer. Specifically, first, the formatter 231 acquires an input image depicting an arbitrary pattern to draw on the base material resist layer. The input image is an image corresponding to a development of the outer circumferential surface of the base material resist layer, in which the outer circumferential surface of the base material resist layer is cut in the axial direction and expanded in a single plane. Next, the formatter 231 partitions the input image into sub-regions of a certain size (for example, partitions the input image into a lattice), and determines whether or not the draw pattern is included in each of the sub-regions. Subsequently, the formatter 231 generates a control signal to perform control to irradiate with the laser light 200A each sub-region determined to include the draw pattern. The control signal (that is, the exposure signal) preferably is synchronized with the rotation of the spindle motor 225, but does not have to be synchronized. In addition, the control signal and the rotation of the spindle motor 225 may also be resynchronized every time the master base material 110 performs one rotation. Furthermore, the driver 233 controls the output of the laser light source 201 on the basis of the control signal generated by the formatter 231. As a result, the irradiation of the base material resist layer by the laser light 200A is controlled. Note that the exposure device 200 may also perform a known exposure control process, such as focus servo and positional correction of the irradiation spot of the laser light 200A. The focus servo may use the wavelength of the laser light 200A, or use another wavelength for reference.

In addition, the laser light 200A radiated from the laser light source 201 may irradiate the base material resist layer after being split into multiple optical subsystems. In this case, multiple irradiation spots are formed on the base material resist layer. In this case, when the laser light 200A emitted from one optical system reaches the latent image formed by another optical system, exposure may be ended.

<7. With Regard to Method for Forming First Micro Concave-Convex Structure and Second Micro Concave-Convex Structure Using Micro Concave-Convex Master>

Figure 6:
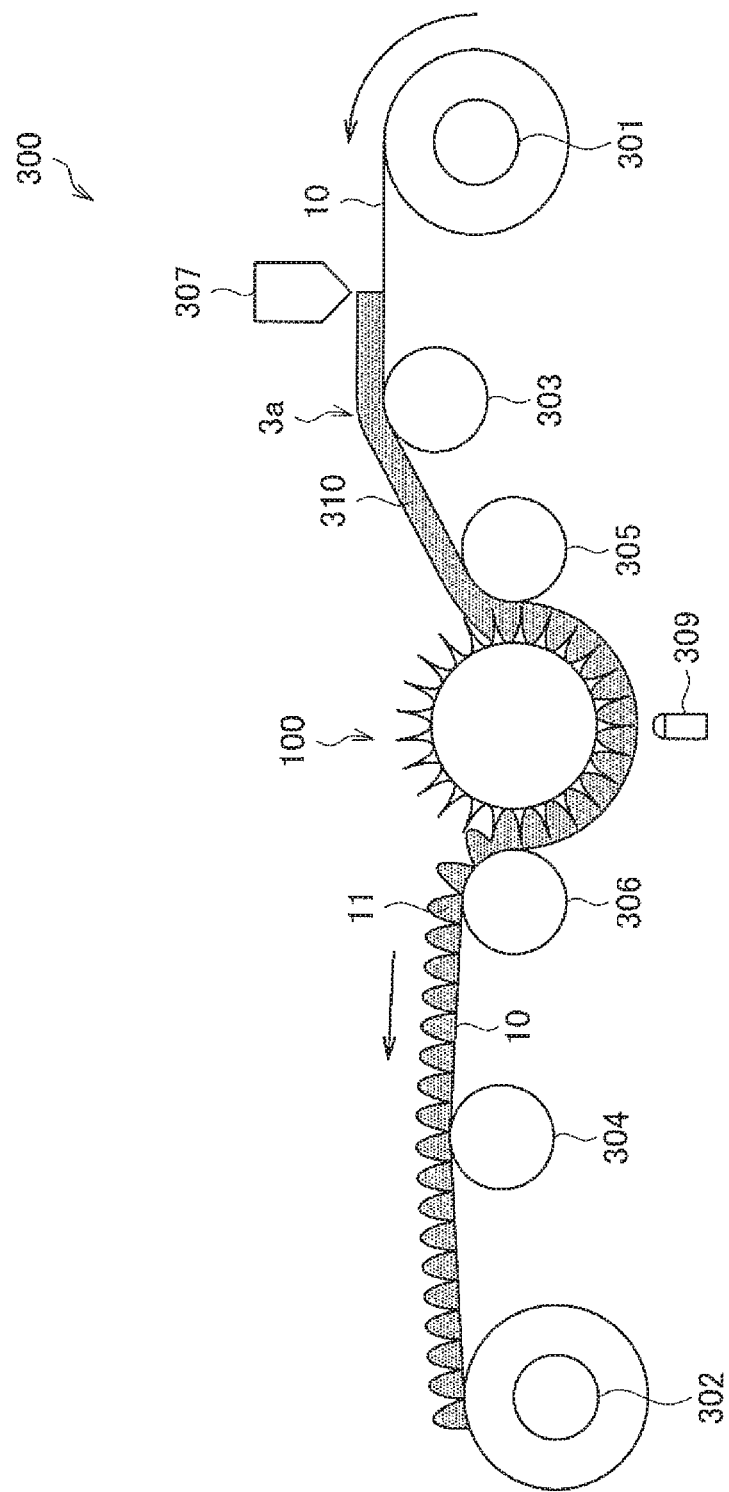
FIG. 6 is a schematic diagram illustrating an example of a transfer device that manufactures an optical body by roll-to-roll.

Next, a method for forming the first micro concave-convex structure 11 on the base material 10 using the micro concave-convex master 100 is described with reference to FIG. 6.

The transfer device 300 is provided with the micro concave-convex master 100, a base material supply roll 301, a take-up roll 302, guide rolls 303 and 304, a nip roll 305, a separation roll 306, an applicator device 307, and a light source 309.

The base material supply roll 301 is a roll around which a long-length base material 10 is wound in a roll, while the take-up roll 302 is a roll that takes up the base material 10 in which the first micro concave-convex structure is formed. Also, the guide rolls 303 and 304 are rolls that transport the base material 10. The nip roll 305 is a roll that puts the base material 10 laminated with an uncured resin layer 310, or in other words a transfer film 3a, in close contact with the micro concave-convex master 100. The separation roll 306 is a roll that separates the base material 10 in which the first micro concave-convex structure 11 is formed, from the micro concave-convex master 100.

The applicator device 307 is provided with an applicating means such as a coater, and applies an uncured light-curing resin composition to the base material 10, and forms the uncured resin layer 310. The type of the light-curing resin composition is not particularly limited, and may be any resin that can form a micro concave-convex structure. The applicator device 307 may be a device such as a gravure coater, a wire bar coater, or a die coater, for example. Also, the light source 309 is a light source that emits light of a wavelength able to cure the light-curing resin composition, and may be a device such as an ultraviolet lamp, for example.

In the transfer device 300, first, the base material 10 is sent continuously from the base material supply roll 301 via the guide roll 303. Note that partway through the delivery, the base material supply roll 301 may also be changed to a base material supply roll 301 of a separate lot. The uncured light-curing resin composition is applied by the applicator device 307 to the delivered base material 10, and the uncured resin layer 310 is laminated onto the base material 10. As a result, the transfer film 3a is prepared. The transfer film 3a is put into close contact with the micro concave-convex master 100 by the nip roll 305. The light source 309 irradiates with light the uncured resin layer 310 put in close contact with the micro concave-convex master 100, thereby curing the uncured resin layer 310. With this arrangement, the arrangement pattern of the master concave-convex structure 120 formed on the outer circumferential face of the micro concave-convex master 100 is transferred to the uncured resin layer 310. In other words, the first micro concave-convex structure 11 having the inverse shape of the master concave-convex structure 120 is formed on the base material 10. Next, the base material 10 in which the first micro concave-convex structure 11 is formed, is separated from the micro concave-convex master 100 by the separation roll 306. Next, the base material 10 is taken up by the take-up roll 302 via the guide roll 304. Note that the micro concave-convex master 100 may be oriented vertically or oriented horizontally, and a mechanism that corrects the angle and eccentricity of the micro concave-convex master 100 during rotation may also be provided separately. For example, an eccentric tilt mechanism may be provided in a chucking mechanism.

In this way, in the transfer device 300, the circumferential shape of the micro concave-convex master 100 is transferred to the transfer film 3a while transporting the transfer film 3a roll-to-roll. As a result, the first micro concave-convex structure 11 is formed on the base material 10.

In the present embodiment, since the base material 10 is formed of a thermoplastic resin, the master concave-convex structure 120 of the micro concave-convex master 100 may be transferred directly onto the base material 10. In this case, the applicator device 307 and the light source 309 are unnecessary. Further, a heating device is placed on the upstream side of the micro concave-convex master 100. The base material 10 is heated and softened by the heating device, and then the base material 10 is pressed against the micro concave-convex master 100. Thereby, the master concave-convex structure 120 formed on the circumferential surface of the micro concave-convex master 100 is transferred to the base material 10. Therefore, the transfer device 300 can form the first micro concave-convex structure 11 on the base material 10 continuously.

In addition, a transfer film to which the master concave-convex structure 120 of the micro concave-convex master 100 has been transferred may be produced, and the transfer film may be used as a transfer mold. Also, the micro concave-convex master 100 may be duplicated by electroforming, thermal transfer, or the like, and the duplicate may be used as a transfer mold. Furthermore, the shape of the micro concave-convex master 100 is not necessarily limited to a roll shape, and may also be a planar master. Besides a method of irradiating resist with the laser light 200A, various processing methods can be selected, such as semiconductor exposure using a mask, electron beam lithography, machining, or anodic oxidation.

EXAMPLES

1. Example 1

(1-1. Production of Optical Body)

Figure 7:
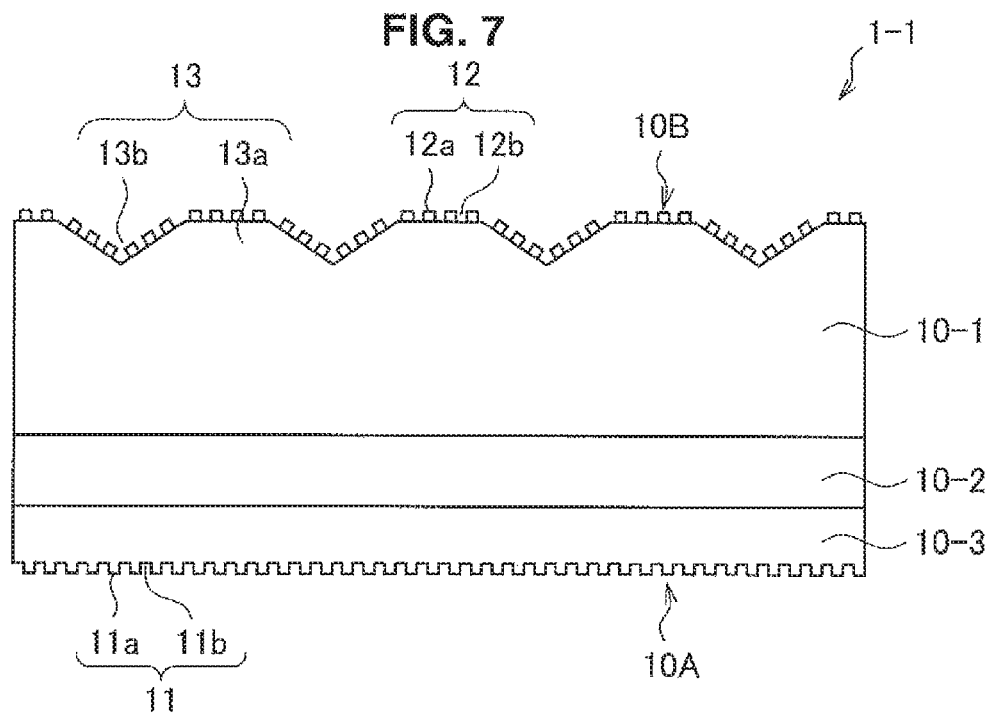
FIG. 7 is a side cross-sectional view showing a rough configuration of an optical body according to Example 1.
Figure 10:
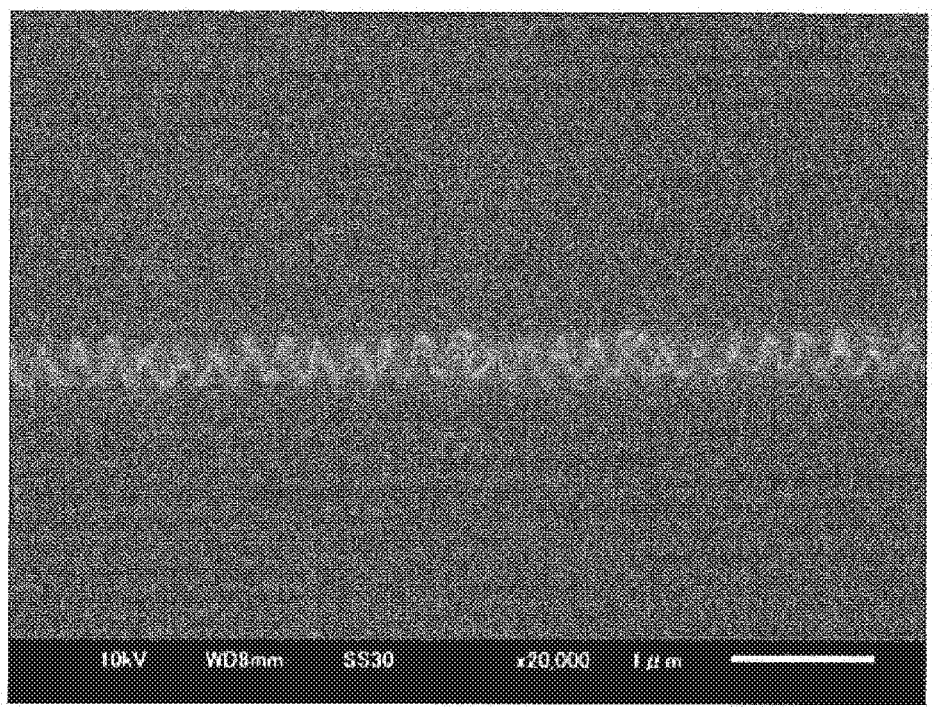
FIG. 10 is a cross-sectional SEM photograph showing a micro concave-convex structure.
Figure 11:
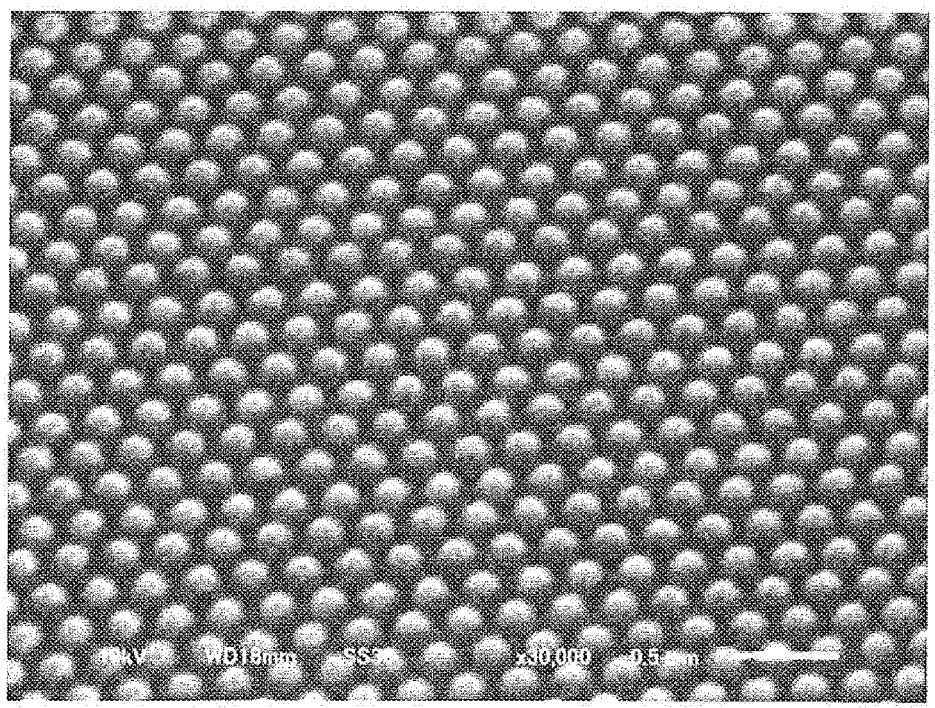
FIG. 11 is a cross-sectional SEM photograph showing a micro concave-convex structure formed to follow a surface of a macro concave-convex structure.

FIG. 7 shows the configuration of an optical body 1-1 according to Example 1. In Example 1, the optical body 1-1 was produced by the following steps. First, a polymethyl methacrylate film with a thickness of 150 μm (Technolloy, manufactured by Sumika Acryl Co., Ltd.) was prepared as a base material 10-1. Next, using the transfer device 300 shown in FIG. 6, the second micro concave-convex structure 12 was formed on one surface (herein, the second surface 10B) of the base material 10-1. Here, an ultraviolet curing acrylic resin composition (SK1120, manufactured by Dexerials Corporation) was used as a light-curing resin composition. In order to enhance the adhesiveness between the base material 10-1 and the cured layer of the uncured resin layer, the second surface 10B of the base material 10-1 was subjected to primer treatment in advance. A primer layer with a thickness of approximately 3 μm was formed on the second surface 10B of the base material 10-1 by the primer treatment. Specifically, primer treatment was performed by applying a polycarbonate resin and performing drying. The second micro concave-convex structure 12 was caused to be arranged in a zigzag fashion. The dot pitch P1 was set to 230 nm, and the track pitch P2 was set to 153 nm. The average height of the second micro convexity 12a was 250 nm. The base material 10-1 was a long-length rectangular film. The dot arrangement direction L20 was parallel to the longitudinal direction of the base material 10-1, and the crossing arrangement direction L22 was inclined by approximately 40° with respect to a straight line perpendicular to the dot arrangement direction L20. A SEM photograph of a cross-sectional shape of the second micro concave-convex structure 12 is shown in FIG. 10. Further, a SEM photograph of a planar shape is shown in FIG. 11.

Figure 12:
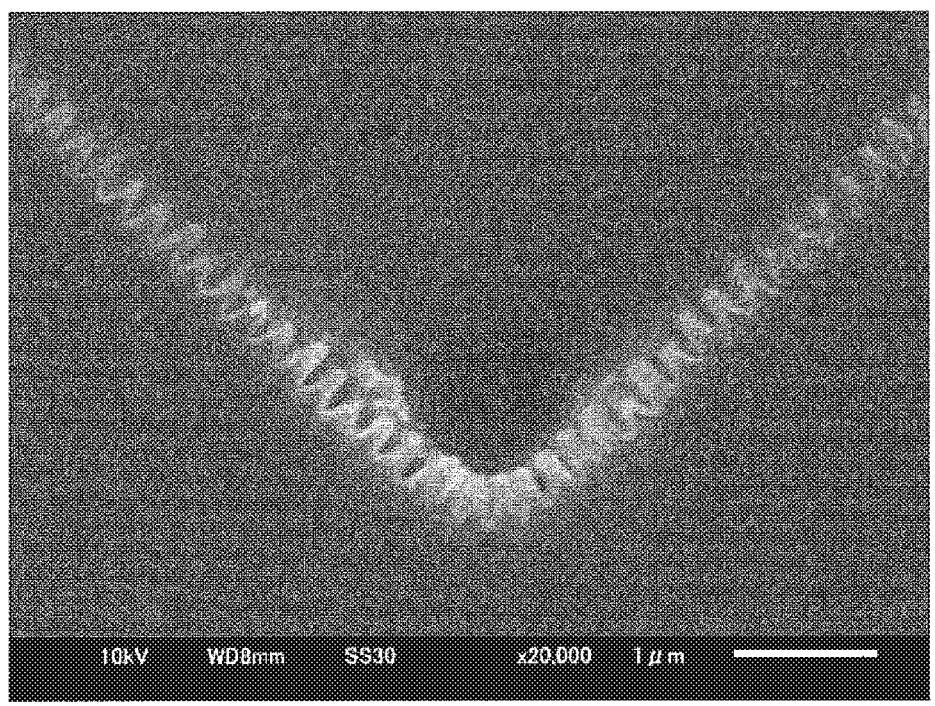
FIG. 12 is a planar SEM photograph showing a micro concave-convex structure.

Next, a macro concave-convex master of a long-length rectangular shape was prepared. The master macro convexity was set to a convexity extending in the lateral direction of the macro concave-convex master, the pitch (the distance between the apices of master macro convexities) was set to 100 μm, and the height was set to 10 μm. The vertex angle was set to 90°. Therefore, the angle between the oblique surface of the master macro convexity and the flat surface between master macro convexities (that is, the bottom surface of the master macro concavity) is 45°. Next, the master macro convexities were transferred to the base material 10-1 by the method described above. Here, a viscous body was used as the pressure-propagating medium, the pressure was set to 0.7 MPa, and the heating temperature was set to 180 to 220° C. That is, the second micro concave-convex structure 12 and the macro concave-convex structure 13 were formed to be superimposed on a second surface of the base material 10-1. It was checked with a SEM whether the second micro concave-convex structure 12 was superimposed on the macro concave-convex structure 13 or not, and it was found that superimposition was made without problems. FIG. 12 is a cross-sectional SEM photograph of a macro concavity 13b. As is clear from this photograph, it was found that the second micro concave-convex structure 12 was formed to be superimposed on the macro concavity 13b. It was also found that the second micro convexity 12a protruded in a perpendicular direction from the surface of the macro concavity 13b. That is, it was also found that the second micro convexity 12a was formed to follow the surface of the macro concavity 13b.

Next, an moth-eye film 10-3 was stuck to the other surface, that is, the first surface 10A of the base material 10-1 via an adhesive film 10-2 with a thickness of 25 μm (a PDS1 film, manufactured by Panac Co., Ltd.). The first micro concave-convex structure 11 has been formed on the moth-eye film 10-3. The moth-eye film 10-3 was produced using the transfer device 300 described above. Specifically, a triacetylcellulose film with a thickness of 60 μm was used as a base material, and an ultraviolet curing acrylic resin composition manufactured by Toagosei Co., Ltd. was used as a light-curing resin composition. The thickness of the cured layer on which the first micro concave-convex structure 11 was formed was set to approximately 3 μm. The concave-convex pattern of the first micro concave-convex structure 11 was set similar to that of the second micro concave-convex structure 12. By the above steps, the optical body 1-1 according to Example 1 was produced. The optical body 1-1 corresponds to the optical body 1 shown in FIG. 1.

(1-2. Characteristics Evaluation)

(1-2-1. Specular Reflection Spectrum)

Figure 20:
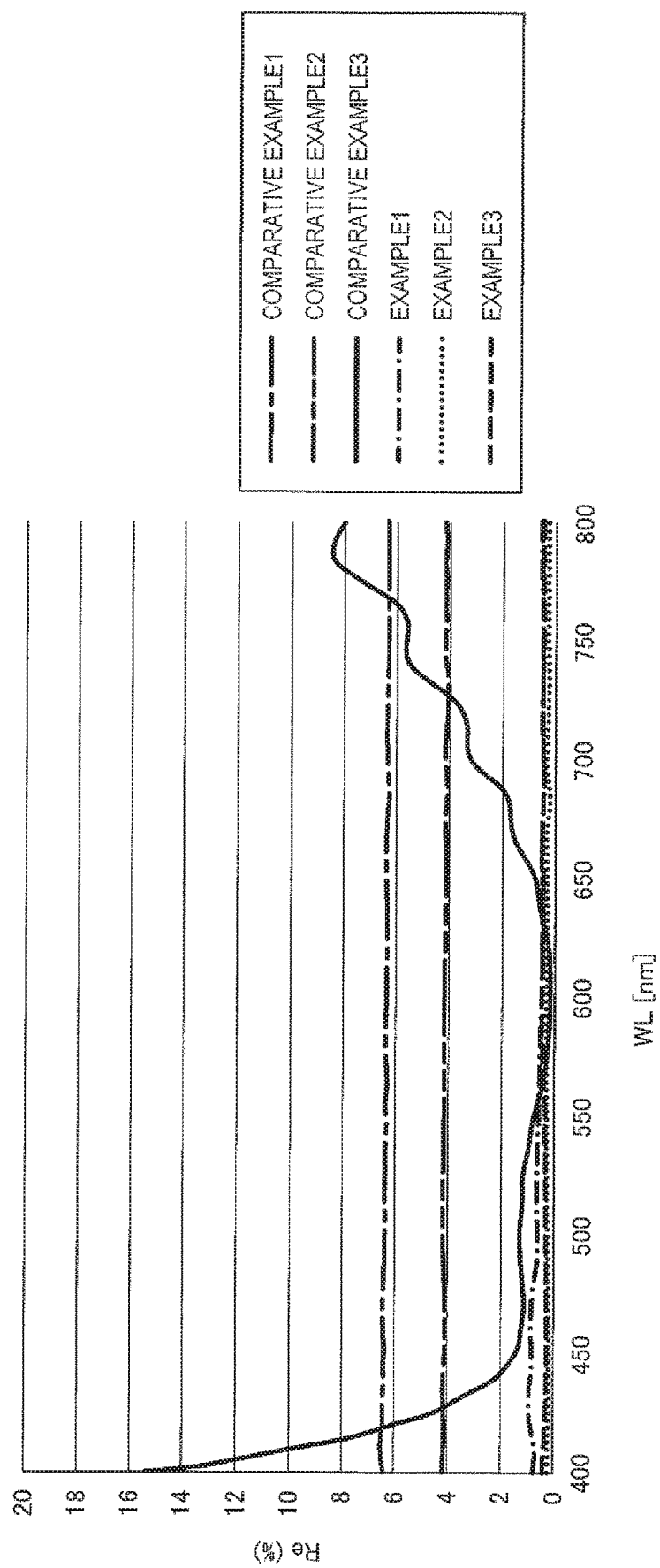
FIG. 20 is a graph showing a specular reflection spectrum of the optical bodies according to Examples 1 to 3 and Comparative Examples 1 to 3 in comparison.

Next, characteristics of the optical body 1-1 were evaluated. First, a spectral specular reflection spectrum of the optical body 1-1 was measured. The measurement of the specular reflection spectrum is to evaluate mainly reflection characteristics in a flat portion of the optical body 1-1. The spectral specular reflection spectrum was measured using a spectrophotometer (model: V-550, equipped with an absolute reflectance measuring unit; manufactured by JASCO Corporation). Both of the incidence angle and the reflection angle were set to 5°, the wavelength range was set to 400 to 800 nm, and the wavelength resolution was set to 1 nm. Measuring light was applied to the second surface 10B. The result is shown in FIG. 20. The horizontal axis of FIG. 20 represents the measuring wavelength (nm), and the vertical axis represents the specular reflectance (%).

(1-2-2. Diffuse Reflection Spectrum)

Figure 21:
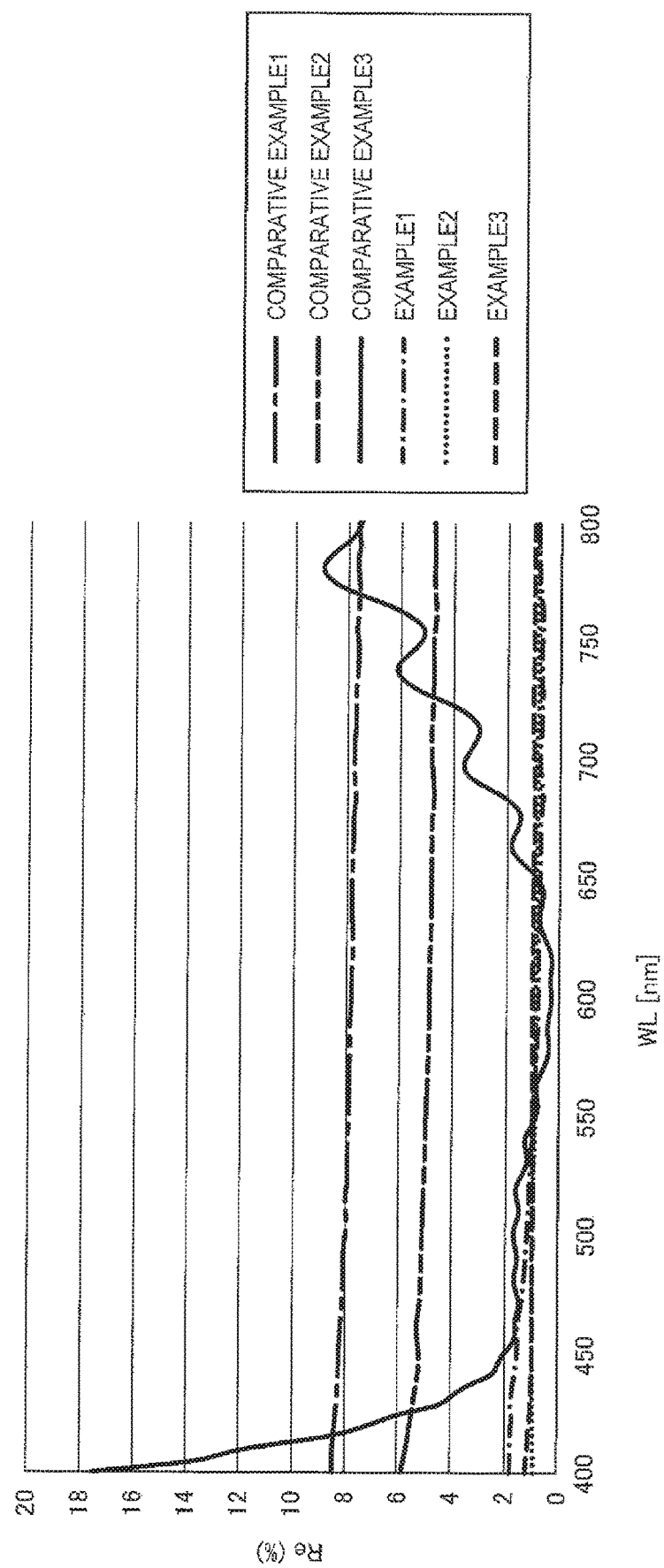
FIG. 21 is a graph showing a diffuse reflection spectrum of the optical bodies according to Examples 1 to 3 and Comparative Examples 1 to 3 in comparison.

Next, a diffuse reflection spectrum of the optical body 1-1 was measured. The measurement of the diffuse reflection spectrum is to evaluate reflection characteristics on the entire surface of the optical body 1-1 including the macro concave-convex structure 13. The diffuse reflection spectrum was measured using the spectrophotometer described above (model: V-550, equipped with an absolute reflectance measuring unit; manufactured by JASCO Corporation) and an absolute reflectance meter, ARV474S (manufactured by JASCO Corporation), in combination. The other conditions were set similar to the measuring conditions of the specular reflection spectrum. The diffuse reflection spectral spectrum is shown in FIG. 21. The horizontal axis of FIG. 21 represents the measuring wavelength (nm), and the vertical axis represents the diffuse reflectance (%).

(1-2-3. Measurement of Luminance and x and y Values)

Next, the luminance and the x and y values (the x and y values in Yxy color coordinates) when the optical body 1-1 was caused to emit light were measured. The measurement was performed by the following steps. The measurement was performed in a dark place environment. First, an LED light source (LPAC1-2430NCW-R4, manufactured by Aitec System Co., Ltd.) was placed on the side of a side surface on the lateral side of the optical body 1-1 (that is, a side surface parallel to the extension direction of the macro concave-convex structure 13). A luminance meter (CS1000, manufactured by Konica Minolta, Inc.) was placed on the first surface 10A side. The placement position was set to a position apart from the first surface 10A by 50 cm, and the optical axis of the luminance meter was set perpendicular to the first surface. Next, high-luminance white light was injected into the optical body 1-1 from the LED light source, and the luminance (cd/cm²) and the x and y values were measured with the luminance meter. In Example 1, the angle between the straight line L21 perpendicular to the propagation direction L of internally propagating light and the crossing arrangement direction L22 is 40°. The results are shown in Table 1.

(1-2-4. Measurement of Luminous Reflectance and Reflection Chromaticity (a*, b*))

Next, on the basis of the specular reflection spectrum mentioned above, the luminous reflectance and the reflection chromaticity (a*, b*) of the optical body 1-1 were calculated. The calculation of the luminous reflectance etc. was performed on the basis of a common formula based on a visibility curve of a human being. The results are shown in Table 2.

TABLE 1

|  | Example 1 | Example 2 | Example 3 | Comparative Example 1 | Comparative Example 2 | Comparative Example 3 |
|---|---|---|---|---|---|---|
| Luminance (cd/cm²) | 71.21 | 59.4 | 71.93 | 59.63 | 62.17 | — |
| x | 0.321 | 0.3285 | 0.3281 | 0.3279 | 0.3158 | — |
| y | 0.3161 | 0.3186 | 0.3223 | 0.3213 | 0.3097 | — |

TABLE 2

|  | Comparative Example 1 | Comparative Example 2 | Comparative Example 3 | Example 1 | Example 2 | Example 3 |
|---|---|---|---|---|---|---|
| Reflection Y value | 6.35 | 4.15 | 0.73 | 0.58 | 0.29 | 0.39 |
| Reflection a* | 0.31 | 0.31 | 0.20 | 0.27 | 0.34 | 0.36 |
| Reflection b* | 0.33 | 0.33 | 0.19 | 0.29 | 0.37 | 0.36 |

2. Example 2

(2-1. Production of Optical Body)

Figure 8:
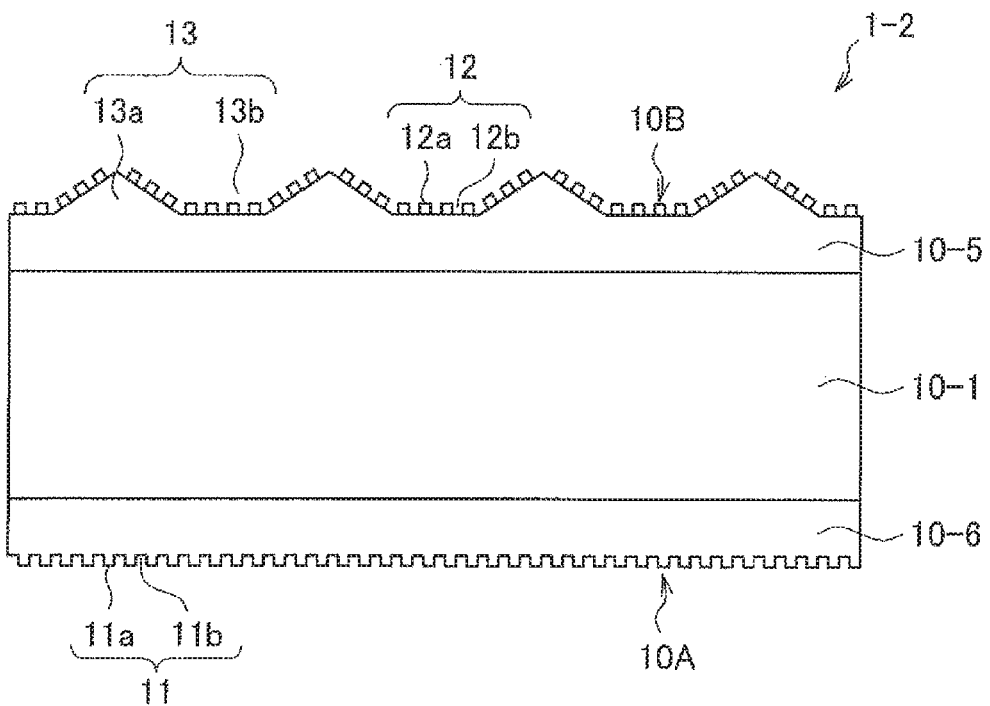
FIG. 8 is a side cross-sectional view showing a rough configuration of an optical body according to Example 2.

FIG. 8 shows the configuration of an optical body 1-2 according to Example 2. In Example 2, the optical body 1-2 was produced by using the optical body 1-1 as a transfer mold. Specifically, first, the base material 10-1 used in Example 1 was prepared. Next, in order to enhance the adhesiveness between the base material 10-1 and each of the cured layers described later, both surfaces of the base material 10-1 were subjected to primer treatment. Specific details of the primer treatment were set similar to those of Example 1. A primer layer with a thickness of approximately 3 μm was formed on both surfaces of the base material 10-1 by the primer treatment. Next, an uncured resin layer of a light-curing resin composition was formed on one surface (herein, the second surface 10B) of the base material 10-1. Next, the shape of the second surface 10B of the optical body 1-1, that is, the second micro concave-convex structure 12 and the macro concave-convex structure 13 were transferred to the uncured resin layer. Thereby, a first macro concave-convex cured layer 10-5 was formed on the second surface 10B of the base material 10-1. The thickness of the first macro concave-convex cured layer 10-5 was set to approximately 3 µm. The second micro concave-convex structure 12 and the macro concave-convex structure 13 have been formed on the first macro concave-convex cured layer 10-5. However, the second micro concave-convex structure 12 and the macro concave-convex structure 13 have the inverse shapes of the second micro concave-convex structure 12 and the macro concave-convex structure 13 of Example 1.

Next, an uncured resin layer of a light-curing resin composition was formed on the other surface, that is, the first surface 10A of the base material 10-1. Next, the shape of the first surface 10A of the optical body 1-1, that is, the first micro concave-convex structure 11 was transferred to the uncured resin layer. Thereby, a first micro concave-convex cured layer 10-6 was formed on the first surface 10A of the base material 10-1. The thickness of the first micro concave-convex cured layer 10-6 was set to approximately 3 µm. The first micro concave-convex structure 11 has been formed on the first micro concave-convex cured layer 10-6. However, the first micro concave-convex structure 11 has the inverse shape of the first micro concave-convex structure 11 of Example 1. By the above steps, the optical body 1-2 according to Example 2 was produced. The optical body 1-2 corresponds to the optical body 1A shown in FIG. 3.

(2-2. Characteristics Evaluation)

Next, the characteristics evaluation of the optical body 1-2 was performed similarly to Example 1. A specular reflection spectrum is shown in FIG. 20, and a diffuse reflection spectrum is shown in FIG. 21. The luminance and the x and y values are shown in Table 1. The luminous reflectance and the reflection chromaticity (a*, b*) are shown in Table 2.

3. Example 3

(3-1. Production of Optical Body)

Figure 9:
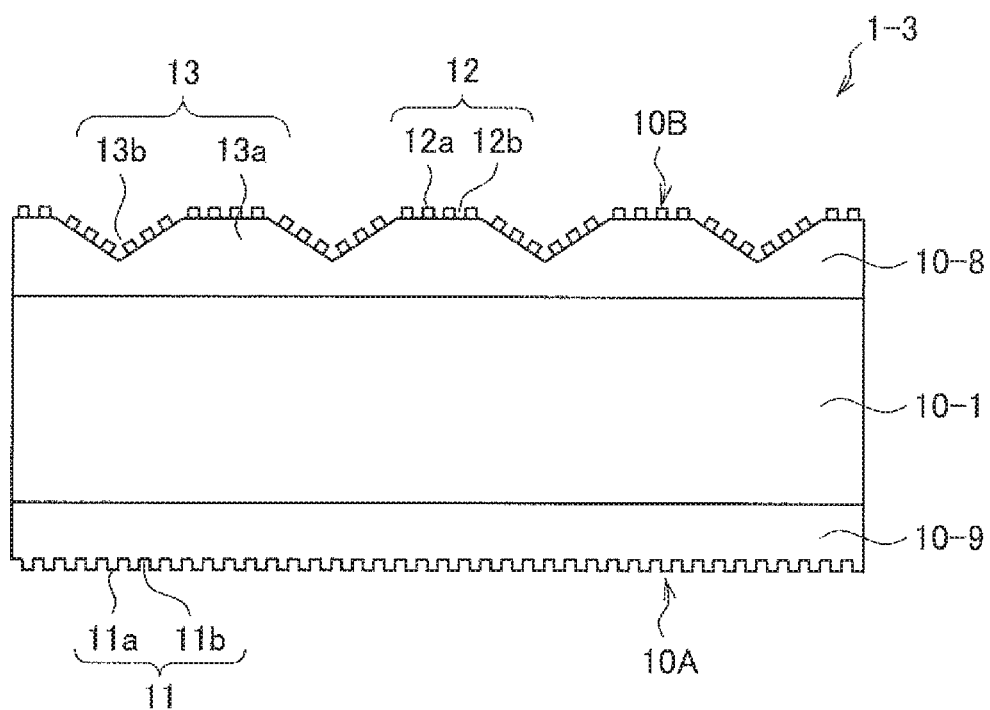
FIG. 9 is a side cross-sectional view showing a rough configuration of an optical body according to Example 3.

FIG. 9 shows the configuration of an optical body 1-3 according to Example 3. In Example 3, the optical body 1-3 was produced by using the optical body 1-2 as a transfer mold. Specifically, first, the base material 10-1 used in Example 1 was prepared. Next, in order to enhance the adhesiveness between the base material 10-1 and each of the cured layers described later, both surfaces of the base material 10-1 were subjected to primer treatment. Specific details of the primer treatment were set similar to those of Example 1. A primer layer with a thickness of approximately 3 µm was formed on both surfaces of the base material 10-1 by the primer treatment. Next, an uncured resin layer of a light-curing resin composition was formed on one surface (herein, the second surface 10B) of the base material 10-1. Next, the shape of the second surface 10B of the optical body 1-2, that is, the second micro concave-convex structure 12 and the macro concave-convex structure 13 were transferred to the uncured resin layer. Thereby, a second macro concave-convex cured layer 10-8 was formed on the second surface 10B of the base material 10-1. The thickness of the second macro concave-convex cured layer 10-8 was set to approximately 3 µm. The second micro concave-convex structure 12 and the macro concave-convex structure 13 have been formed on the second macro concave-convex cured layer 10-8. However, the second micro concave-convex structure 12 and the macro concave-convex structure 13 have the inverse shapes of the second micro concave-convex structure 12 and the macro concave-convex structure 13 of Example 2. That is, the second micro concave-convex structure 12 and the macro concave-convex structure 13 of Example 3 have substantially the same shapes as the second micro concave-convex structure 12 and the macro concave-convex structure 13 of Example 1.

Next, an uncured resin layer of a light-curing resin composition was formed on the other surface, that is, the first surface 10A of the base material 10-1. Next, the shape of the first surface 10A of the optical body 1-2, that is, the first micro concave-convex structure 11 was transferred to the uncured resin layer. Thereby, a second micro concave-convex cured layer 10-9 was formed on the first surface 10A of the base material 10-1. The thickness of the second micro concave-convex cured layer 10-9 was set to approximately 3 µm. The first micro concave-convex structure 11 has been formed on the second micro concave-convex cured layer 10-9. However, the first micro concave-convex structure 11 has the inverse shape of the first micro concave-convex structure 11 of Example 2. That is, the first micro concave-convex structure 11 of Example 3 has substantially the same shape as the first micro concave-convex structure 11 of Example 1. By the above steps, the optical body 1-3 according to Example 3 was produced. The optical body 1-3 corresponds to the optical body 1 shown in FIG. 1.

(3-2. Characteristics Evaluation)

Next, the characteristics evaluation of the optical body 1-3 was performed similarly to Example 1. A specular reflection spectrum is shown in FIG. 20, and a diffuse reflection spectrum is shown in FIG. 21. The luminance and the x and y values are shown in Table 1. The luminous reflectance and the reflection chromaticity (a*, b*) are shown in Table 2.

4. Comparative Example 1

(4-1. Production of Optical Body)

Figure 13:
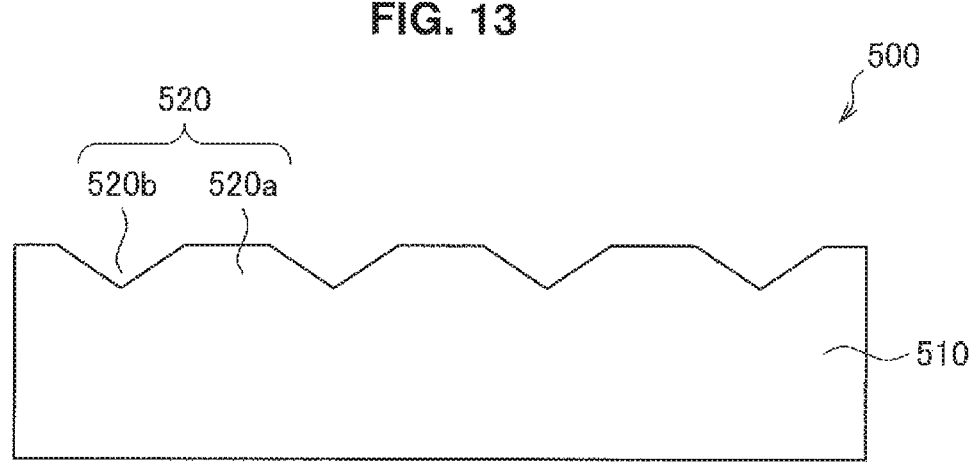
FIG. 13 is a side cross-sectional view showing a rough configuration of an optical body according to Comparative Example 1.

FIG. 13 shows the configuration of an optical body 500 according to Comparative Example 1. In Comparative Example 1, the optical body 500 was produced by the following steps. First, a base material similar to the base material 10-1 used in Example 1 was prepared as a base material 510. Next, using the macro concave-convex master used in Example 1, a macro concave-convex structure 520 was formed on a surface of the base material 510. The macro concave-convex structure 520 has macro convexities 520a and macro concavities 520b, and the macro concavity 520b has the inverse shape of the master macro convexity. By the above steps, the optical body 500 according to Comparative Example 1 was produced.

(4-2. Characteristics Evaluation)

Next, the characteristics evaluation of the optical body 500 was performed similarly to Example 1. A specular reflection spectrum is shown in FIG. 20, and a diffuse reflection spectrum is shown in FIG. 21. The luminance and the x and y values are shown in Table 1. The luminous reflectance and the reflection chromaticity (a*, b*) are shown in Table 2.

5. Comparative Example 2

(5-1. Production of Optical Body)

Figure 14:
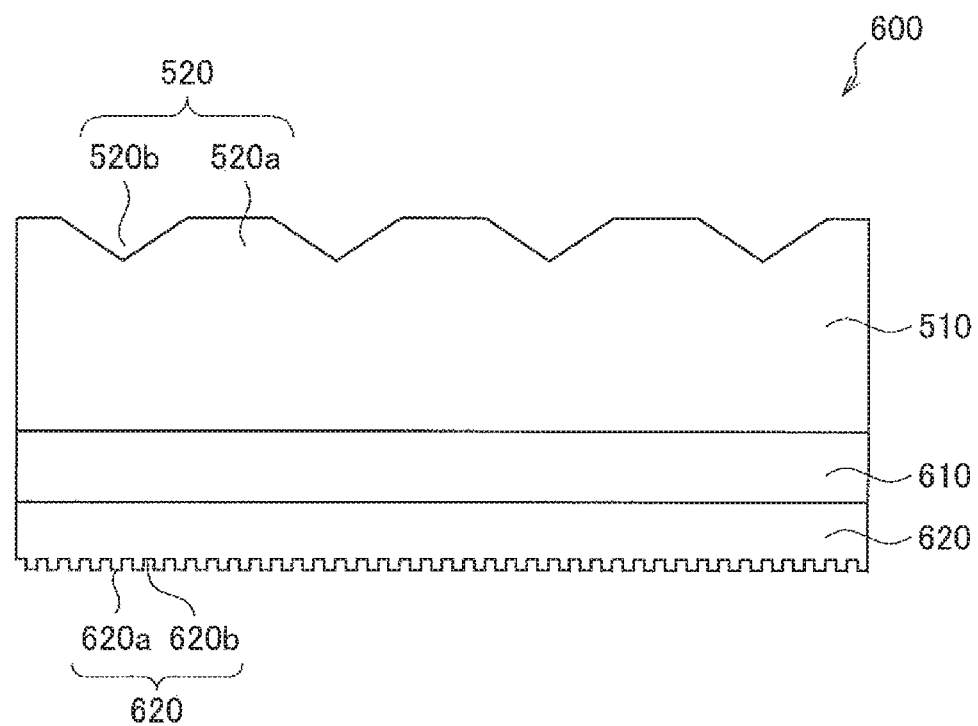
FIG. 14 is a side cross-sectional view showing a rough configuration of an optical body according to Comparative Example 2.

FIG. 14 shows the configuration of an optical body 600 according to Comparative Example 2. In Comparative Example 2, the optical body 600 was produced by sticking a moth-eye film 620 to the back surface of the optical body 500 (that is, the surface on the side where the macro concave-convex structure 520 was not formed) via an adhesive film 610. Here, similar films to the adhesive film 10-2 and the moth-eye film 10-3 used in Example 1 were used as the adhesive film 610 and the moth-eye film 620.

(5-2. Characteristics Evaluation)

Next, the characteristics evaluation of the optical body 600 was performed similarly to Example 1. A specular reflection spectrum is shown in FIG. 20, and a diffuse reflection spectrum is shown in FIG. 21. The luminance and the x and y values are shown in Table 1. The luminous reflectance and the reflection chromaticity (a*, b*) are shown in Table 2.

6. Comparative Example 3

(6-1. Production of Optical Body)

Figure 15:
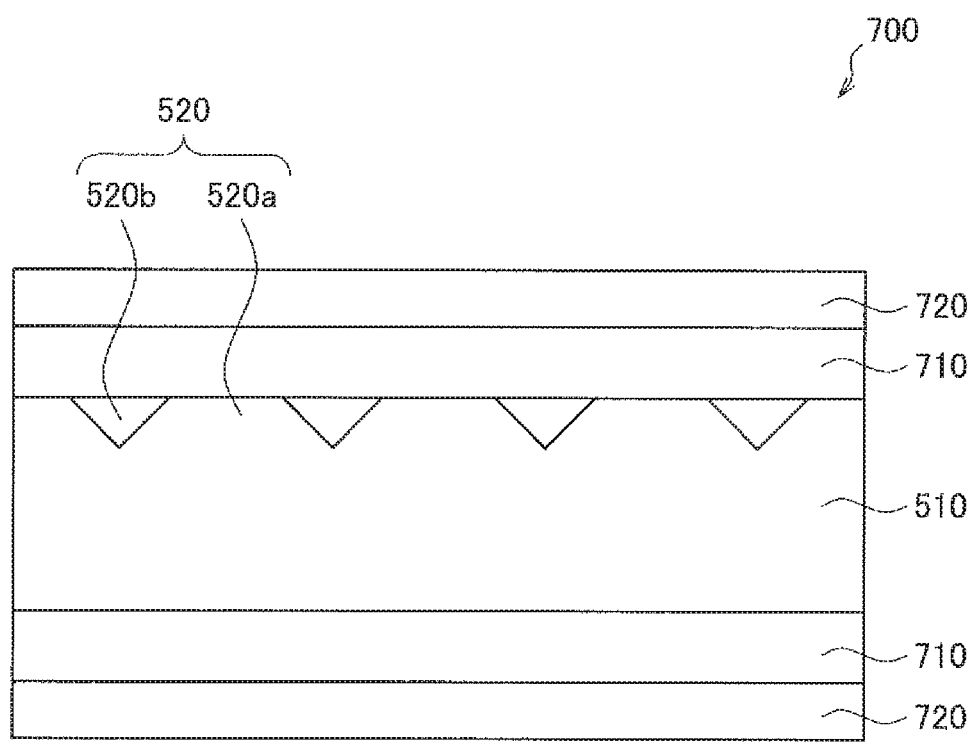
FIG. 15 is a side cross-sectional view showing a rough configuration of an optical body according to Comparative Example 3.

FIG. 15 shows the configuration of an optical body 700 according to Comparative Example 3. In Comparative Example 3, the optical body 700 was produced by sticking an antireflection film 720 with a thickness of 60 μm to each of both surfaces of the optical body 500 via an adhesive film 710. Here, a similar film to the adhesive film 10-2 used in Example 1 was used as the adhesive film 610. An AR film of an inorganic four-layer film manufactured by Dexerials Corporation was used as the antireflection film 720.

(5-2. Characteristics Evaluation)

Next, the characteristics evaluation of the optical body 600 was performed similarly to Example 1. A specular reflection spectrum is shown in FIG. 20, and a diffuse reflection spectrum is shown in FIG. 21. The luminance and the x and y values are shown in Table 1. The luminous reflectance and the reflection chromaticity (a*, b*) are shown in Table 2.

7. Consideration

Next, the results of the characteristics evaluation are considered. First, the results of all the specular reflection spectra and the diffuse reflection spectra of Examples 1 to 3 were better than those of Comparative Examples 1 to 3. That is, the results of all the specular reflectances and the diffuse reflectances of Examples 1 to 3 were lower than those of Comparative Examples 1 to 3. In Comparative Example 1, no micro concave-convex structure was formed, and therefore both the specular reflectance and the diffuse reflectance were high values. In Comparative Example 2, a micro concave-convex structure was formed on one surface, and therefore better results than in Comparative Example 1 were obtained; but the results were insufficient to withstand practice. In Comparative Example 3, an antireflection film was stuck to each of both surfaces, and therefore better results than in Comparative Examples 1 and 2 were obtained in specific wavelength regions. However, conversely, worse results than in Comparative Examples 1 and 2 were obtained in low wavelength regions and high wavelength regions. Thus, in Examples 1 to 3, a micro concave-convex structure was formed on each of both surfaces of the optical bodies 1-1 to 1-3, and therefore an excellent antireflection function has been achieved. Furthermore, for the luminances and the x and y values of Examples 1 to 3, almost equal results to the luminances and the x and y values of Comparative Examples 1 and 2 were obtained. Furthermore, with attention on Examples 1 and 3, the luminances of these were very excellent values relative to those of Comparative Examples 1 and 2. This is presumed to be because the micro concave-convex structures suppressed the reflection of internally propagating light in the insides of the optical bodies 1-1 and 1-3. In Comparative Example 13, it was impossible to measure the luminance and the x and y values. This is presumed to be because the macro concave-convex structure 520 was filled with the antireflection film 720.

The luminances of Examples 1 and 3 were more excellent than the luminance of Example 2. In Examples 1 and 3, the macro concavities 13b, which are portions where internally propagating light reflects, are engraved on the inside of the optical bodies 1-1 and 1-3. Hence, most of the internally propagating light traveling in directions perpendicular to the thickness direction of the optical bodies 1-1 and 1-3, what is called parallel light, is incident on the film and the concavities 13b, and is totally reflected. On the other hand, in Example 2, the macro convexities 13a, which are portions where internally propagating light reflects, protrude on the outside in the thickness direction of the optical body 1-2. Hence, the parallel light mentioned above is less likely to be incident on the macro convexities 13a. It is presumed that, due to these facts, the luminances of Examples 1 and 3 were more excellent than the luminance of Example 2.

In light emission based on the macro concave-convex structure 13, it is required to produce as neutral a color as possible. In this respect, the light emission of Comparative Example 1 is supposed to produce the most neutral color. The x and y values of Examples 1 to 3 are very close to the x and y values of Comparative Example 1. Therefore, it can be said that also Examples 1 to 3 were able to produce a neutral color.

Next, the luminous reflectance and the reflection chromaticity (a*, b*) are considered. In Examples 1 to 3, the luminous reflectance (reflection Y value) was less than or equal to 1.0%, and the reflection chromaticity (a*, b*) was less than or equal to 1.0. Thus, it has been found that, in Examples 1 to 3, an excellent antireflection function has been achieved also in this respect. On the other hand, in Comparative Examples 1 and 2, the luminous reflectance was very large. In Comparative Example 3, an antireflection film was stuck to each of both surfaces of the optical body 500, and therefore the luminous reflectance and the reflection chromaticity were good. However, as described above, in Comparative Example 3 it was impossible to measure the luminance and the x and y values.

8. Verification on Arrangement Direction of Micro Concave-Convex Structure

Figure 18:
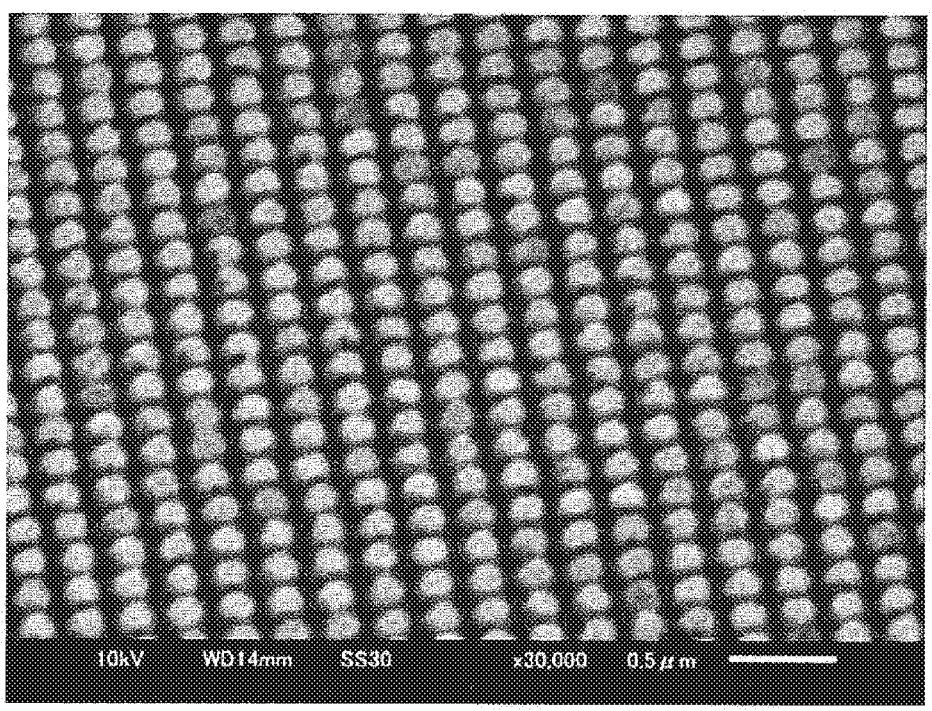
FIG. 18 is a planar SEM photograph showing a micro concave-convex structure according to Comparative Example 4.

Next, the following experiment was performed in order to verify the corresponding relationship between the arrangement direction of the micro concave-convex structure and the propagation direction L. First, an optical body 1-1A in which the macro concave-convex structure 13 was excluded from the optical body 1-1 described above was prepared as an optical body corresponding to the present embodiment. The optical body 1-1A was produced by excluding the step of the macro concave-convex master from the steps of producing the optical body 1-1. Next, as an optical body for comparison (Comparative Example 4), an optical body in which each of the first micro concave-convex structure 11 and the second micro concave-convex structure of the optical body 1-1A was changed to a micro concave-convex structure 800 shown in FIG. 16 (hereinafter, such an optical body is also referred to as an "optical body 1-1B") was prepared. The micro concave-convex structure 800 has large numbers of micro convexities 800a and micro concavities 800b. The optical body 1-1B was produced by changing the master concave-convex structure 120 of the micro concave-convex master 100 of the transfer device 300. The dot pitch P1, the track pitch P2, and the average height of the micro concave-convex structure 800 were set similar to those of the first micro concave-convex structure 11 and the second micro concave-convex structure 12 of Example 1. However, the arrangement was set to a lattice-like arrangement, and the dot arrangement direction L20 was set to a direction parallel to the longitudinal direction of the optical body 1-1B. A planar SEM photograph of the micro concave-convex structure 800 is shown in FIG. 18.

Figure 19:
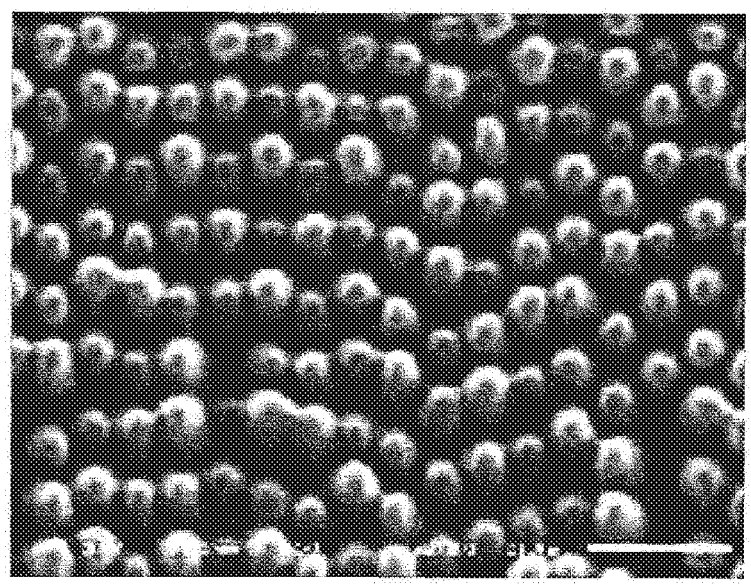
FIG. 19 is a planar SEM photograph showing a micro concave-convex structure according to Comparative Example 5.

Further, as an optical body for comparison (Comparative Example 5), an optical body in which each of the first micro concave-convex structure 11 and the second micro concave-convex structure of the optical body 1-1A was changed to the micro concave-convex structure shown in the SEM photograph shown in FIG. 19, that is, a micro concave-convex structure in which concavities and convexities were arranged randomly (hereinafter, such an optical body is also referred to as an "optical body 1-1D") was prepared. Such a micro concave-convex structure was produced by changing the master concave-convex structure 120 of the micro concave-convex master 100 of the transfer device 300. Here, the micro concave-convex master 100 was produced by, when performing exposure using the exposure device 200, changing the irradiation interval of laser light 200A randomly. The average period of the micro concave-convex structure was set to 200 nm.

Figure 16:
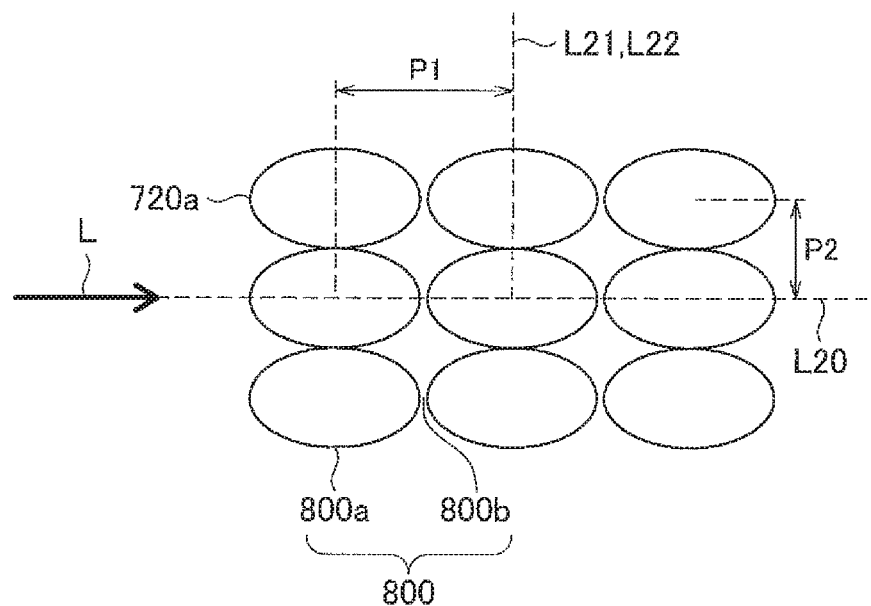
FIG. 16 is a plan view showing a planar shape of a micro concave-convex structure according to Comparative Example 4.

Next, an experiment similar to the measurement of the luminance and the x and y values described above was performed. In the optical body 1-1A, the angle between the straight line L21 perpendicular to the propagation direction L of internally propagating light and the crossing arrangement direction L22 is 40°. On the other hand, in the optical body 1-1B, as shown in FIG. 16, the angle between the straight line L21 perpendicular to the propagation direction L of internally propagating light and the crossing arrangement direction L22 is 0°. In the optical body 1-1C, concavities and convexities are arranged randomly, and therefore the arrangement direction cannot be defined.

Figure 17:
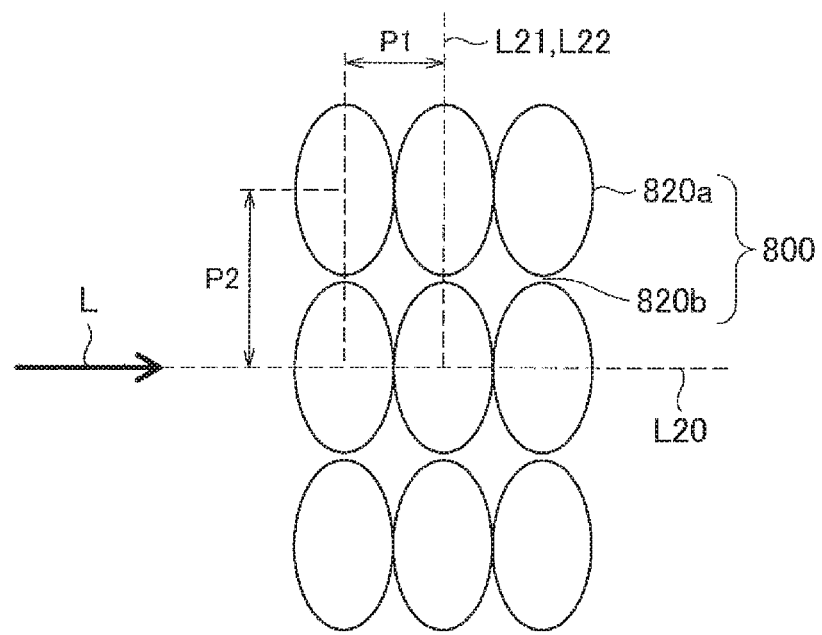
FIG. 17 is a plan view showing a planar shape of a micro concave-convex structure according to Comparative Example 4.

In all the optical bodies 1-1A to 1-1C, a macro concave-convex structure is not provided, and therefore theoretically it is expected that the luminance will not be measured. That is, it can be said that, as the measurement value of luminance becomes smaller, it becomes more difficult for the observer to visually identify leaked light. As a result, the luminance of the optical body 1-1A was 8.5 cd/m², the luminance of the optical body 1-1B was 9.2 cd/m², and the luminance of the optical body 1-1C was 12.3 cd/m². Here, with regard to the optical body 1-1B, a similar experiment was further performed by setting the position of the LED light source on a side surface on the longitudinal side of the optical body 1-1B. A corresponding relationship between the propagation direction L, and the dot arrangement direction L20 and the crossing arrangement direction L22 at this time is shown in FIG. 17. Also in this case, the angle between the straight line L21 perpendicular to the propagation direction L of internally propagating light and the crossing arrangement direction L22 is 0°. The luminance of the optical body 1-1B was 9.7 cd/m². Thus, the luminance of the optical body 1-1A was smallest.

Therefore, it has been found that, in order to suppress the visibility of leaked light, it is necessary that the micro concave-convex structure be arranged periodically, the crossing arrangement direction L22 be inclined with respect to the straight line L21 perpendicular to the propagation direction L of internally propagating light, and the angle between the crossing arrangement direction L22 and the straight line L21 be 30 to 60° C.

9. Verification on Average Height of Micro Concave-Convex Structure

Figure 22:
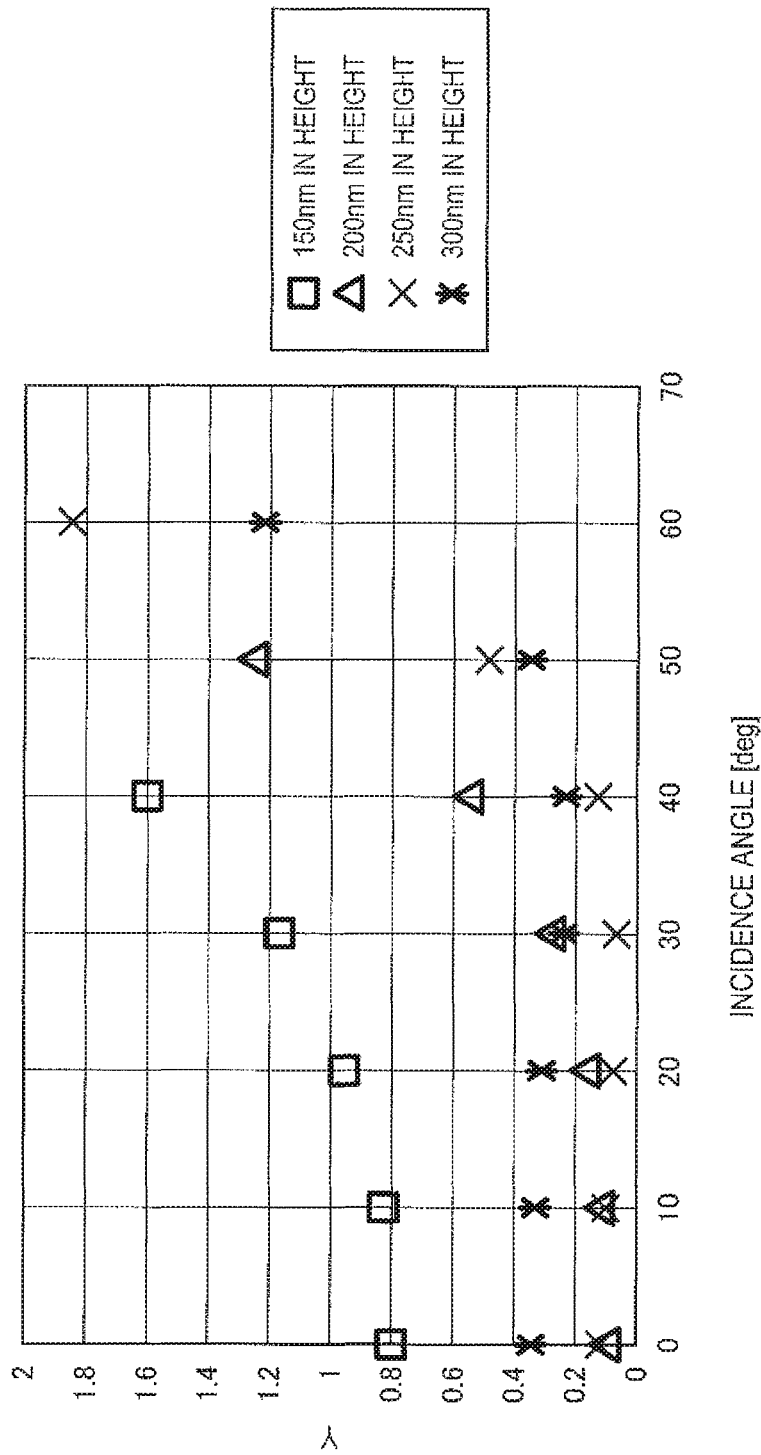
FIG. 22 is a graph showing corresponding relationships between an incidence angle of measuring light and a reflection Y value (luminous reflectance) on the basis of a height of a micro concave-convex structure.

Next, the following simulation was performed in order to verify the average height of the micro concave-convex structure. First, an optical body in which only the first micro concave-convex structure 11 was formed on the base material 10 was envisaged, and parameters proper to this optical body were inputted to a thin film simulation software application (TFCalc). Here, it was assumed that the first micro concave-convex structure 11 had a shape in the depth direction of an artillery shell-like shape like one obtained by a quadratic function, and was arranged in an arrangement pattern similar to that of Example 1. Then, the first micro concave-convex structure 11 was modeled as a multiple-layer film of 10 layers. Each layer was approximated on the assumption that the height of concavity and convexity was divided into 10 pieces. Then, the incidence angle was changed within the range of 0 to 70°, and the measuring wavelength was set to 380 nm to 780 nm. The reflection angle was set to the same value as the incidence angle. Then, similar processing was performed while the average height of the first micro concave-convex structure 11 (specifically, the average height of the first micro convexity 11a) was changed. Then, the luminous reflectance (that is, the Y value in a Yxy color space) was measured. The results are shown in FIG. 22. The horizontal axis of FIG. 22 represents the incidence angle of measuring light, and the vertical axis represents the luminous reflectance (reflection Y value).

In view of the shape of the macro concave-convex structure 13, incidence at incidence angles of 30 to 50° corresponds to incidence on the macro concave-convex structure 13. Thus, the luminous reflectance being small in this range means that also the luminous reflectance in the place on the macro concave-convex structure 13 is small. In this respect, it has been found that, when the average height is more than or equal to 200 nm, the luminous reflectance is sufficiently small.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST

1 optical body
10 base material
11 first micro concave-convex structure
11a first micro convexity
11b first micro concavity
12 second micro concave-convex structure
12a second micro convexity
12b second micro concavity
13 macro concave-convex structure
13a macro convexity
13b macro concavity
20 light source

The invention claimed is:

1. An optical body comprising:
a base material;
a macro concave-convex structure that is formed on one surface of the base material and emits internally propagating light that is injected in an inside of the base material from a side surface of the base material, from another surface of the base material; and
a micro concave-convex structure formed periodically to follow each of both surfaces of the base material and a surface of the macro concave-convex structure, and having an average period of concavity and convexity of less than or equal to a wavelength of visible light,
wherein the surface of the macro concave-convex structure has an inclined surface that is inclined with respect to the one surface by more than or equal to 30° and less than 90°, and
in a plan view on the one surface of the base material and the another surface of the base material, respectively, an arrangement of the micro concave-convex structure is a pattern with respect to a traveling direction of internally propagating light,
wherein the pattern comprises a first row of micro concave-convex structures and a second row of micro concave-convex structures;
the first and the second row are arranged parallel and adjacent to each other and parallel with respect to the traveling direction of internally propagating light;
a track pitch between the first row and the second row, which is a distance, perpendicular to a length direction of the first row and the second row, between centers of the micro concave-convex structures in the first row and the second row, is less than or equal to a wavelength of visible light; and
the micro concave-convex structures in the first row and the second row are mutually shifted in the length direction of each row by half a dot pitch, where the dot pitch is a distance between centers of adjacent micro concave-convex structures in a same row,
wherein, in a plan view on the one surface of the base material and the another surface of the base material, respectively, an angle between an arrangement direction of the micro concave-convex structure and a direction perpendicular to a propagation direction of the internally propagating light is 30 to 60°.

2. The optical body according to claim 1,
wherein the one surface is partitioned into a light emitting region where the macro concave-convex structure is formed and a non-light emitting region other than the light emitting region, and
the micro concave-convex structure is formed in each of both of the light emitting region and the non-light emitting region.

3. The optical body according to claim 1,
wherein the micro concave-convex structure extends in a direction perpendicular to the surface of the macro concave-convex structure.

4. The optical body according to claim 1,
wherein the macro concave-convex structure is an aggregate of a plurality of macro convexities and a plurality of macro concavities and at least one of the plurality of macro convexities and the plurality of macro concavities has a prism shape, and
the micro concave-convex structure is formed to follow a surface of each of the plurality of macro convexities and the plurality of macro concavities.

5. The optical body according to claim 1,
wherein a luminous reflectance is less than or equal to 1.0%.

6. The optical body according to claim 1,
wherein an average height of the micro concave-convex structure is more than or equal to 200 nm.

7. The optical body according to claim 1,
wherein the base material has a multiple-layer structure.

8. A light emitting device comprising:
the optical body according to claim 1; and
a light source that is provided on a side surface of the optical body and injects light into an inside of the optical body from the side surface of the optical body.

9. The optical body according to claim 5,
wherein further a chromaticity of light reflected from the optical body (a*, b*) is less than or equal to 1.0.

10. The optical body according to claim 7,
wherein the base material comprises at least one selected from the group consisting of polymethyl methacrylate, polycarbonate, A-PET, cycloolefin copolymer, and cycloolefin polymer.

* * * * *